(12) United States Patent
Murata

(10) Patent No.: US 8,451,635 B2
(45) Date of Patent: May 28, 2013

(54) SWITCHING POWER SUPPLY DEVICE HAVING A CONSTANT VOLTAGE CHARACTERISTIC AND SEMICONDUCTOR DEVICE

(75) Inventor: Kazuhiro Murata, Hyogo (JP)

(73) Assignee: Panasonic Corporation, Osaka (JP)

( * ) Notice: Subject to any disclaimer, the term of this patent is extended or adjusted under 35 U.S.C. 154(b) by 374 days.

(21) Appl. No.: 12/872,388

(22) Filed: Aug. 31, 2010

(65) Prior Publication Data

US 2011/0063879 A1   Mar. 17, 2011

(30) Foreign Application Priority Data

Sep. 11, 2009  (JP) ................................. 2009-210944

(51) Int. Cl.
  *H02M 3/335*  (2006.01)
(52) U.S. Cl.
  USPC ................... 363/21.16; 363/21.08; 363/21.12
(58) Field of Classification Search
  USPC .......... 363/21.04, 21.08, 21.12, 21.16, 21.17, 363/97
  See application file for complete search history.

(56) References Cited

U.S. PATENT DOCUMENTS

| 7,616,004 | B1 * | 11/2009 | Schofield et al. ............. 324/522 |
| 7,696,737 | B2 * | 4/2010 | Polivka ......................... 323/284 |
| 2003/0043601 | A1 * | 3/2003 | Balakrishnan et al. .... 363/21.12 |
| 2005/0169017 | A1 * | 8/2005 | Muegge et al. ............ 363/21.15 |
| 2006/0050539 | A1 | 3/2006 | Yang et al. |
| 2007/0064358 | A1 | 3/2007 | Murata et al. |
| 2007/0183171 | A1 * | 8/2007 | Niijima ....................... 363/21.04 |
| 2008/0084713 | A1 * | 4/2008 | Baurle et al. ............... 363/21.01 |
| 2008/0246456 | A1 | 10/2008 | Djenguerian et al. |
| 2008/0259650 | A1 * | 10/2008 | Huynh et al. .............. 363/21.12 |
| 2009/0001954 | A1 * | 1/2009 | Morota .......................... 323/282 |
| 2009/0033307 | A1 * | 2/2009 | Park et al. ..................... 323/293 |
| 2009/0279332 | A1 * | 11/2009 | Grant et al. ..................... 363/84 |
| 2010/0110734 | A1 * | 5/2010 | Park ............................ 363/21.16 |
| 2010/0208500 | A1 * | 8/2010 | Yan et al. ................... 363/21.12 |
| 2010/0315840 | A1 * | 12/2010 | Cohen ......................... 363/21.04 |

FOREIGN PATENT DOCUMENTS

| JP | 7-170731 | 7/1995 |
| JP | 2004-229437 | 8/2004 |
| JP | 2007-116890 | 5/2007 |
| JP | 2008-259418 | 10/2008 |

* cited by examiner

*Primary Examiner* — Adolf Berhane
*Assistant Examiner* — Fred E Finch, III
(74) *Attorney, Agent, or Firm* — McDermott Will & Emery LLP

(57) ABSTRACT

The switching power supply device includes: an input unit which receives an input voltage; a transformer which includes a primary winding and a secondary winding; an output unit which provides an output voltage; a switching element; and a control circuit. The control circuit includes: a T2on measuring unit which measures a secondary-side conduction time period; a frequency control circuit which provides a second signal used for changing an on-frequency of the switching element in order to narrow a difference between the measured secondary-side conduction time period and a reference value; a primary current detecting circuit which detects a primary current; a current comparing circuit which provides a third signal used for turning the switching element off when the detected primary current becomes equal to a threshold value; and an oscillation control circuit which controls on-off switching of the switching element according to the second signal and the third signal.

17 Claims, 13 Drawing Sheets

SWITCHING POWER SUPPLY DEVICE HAVING A CONSTANT VOLTAGE CHARACTERISTIC AND SEMICONDUCTOR DEVICE

BACKGROUND OF THE INVENTION (1) Field of the Invention

The present invention relates to switching power supply devices having a constant voltage characteristic suitable to supply an output voltage with high accuracy.

(2) Description of the Related Art

Most of switching power supply devices are required to have a constant voltage characteristic suitable to supply a stable output voltage, regardless of a state of a load and a value of an output current. An electrically isolated switching power supply device equipped with a transformer, however, has an output voltage generating portion and a switching element controlling portion both isolated. Thus, these isolated portions make it difficult for the switching power supply device to carry out control in order to achieve the constant voltage characteristic. In view of such a difficulty, techniques to obtain the constant voltage characteristic have been studied.

As the most typical technique, for example, Patent Reference 1 (Japanese Unexamined Patent Application Publication No. 2007-116890) describes a technique to control a constant voltage used for a switching power supply device. The technique involves the following operations: a shunt regulator placed on the secondary side detects an output voltage; then, the information on the output voltage is transferred to the primary side by a photocoupler; and consequently, the information is transferred to a control circuit. Regardless of the output current value, the above operations allow the control circuit to control an output voltage to be constant by adjusting energy supplied through switching performed by the switching element.

As this example shows, the following three functions are necessary in order to achieve a constant voltage characteristic in an isolated power supply:

(i) a part and a method for detecting an output voltage;

(ii) a method for transferring a signal in an isolated part; and (iii) a part and a method for adjusting energy supply so as to make an output voltage constant.

An output power is the product of an output voltage and an output current. In order to make the output voltage constant while the value of the output current is changing, energy supply needs to be adjusted. To adjust the energy, the output voltage needs to be detected. In order to prevent the detected output voltage from changing, the supplied energy needs to be adjusted. Since a signal needs to be transferred through the isolated part, as described above, the previously mentioned three functions are required. In this example, the shunt regulator, the photocoupler, and the control circuit for the switching element respectively exercise the functions (i), (ii), and (iii).

This technique, however, requires an expensive photocoupler. Demanded in the market instead is power supplies having no photocoupler in order to reduce the cost.

In order to meet the demand of the market, Patent Reference 2 (Japanese Unexamined Patent Application Publication No. 07-170731) introduces a technique to achieve a constant voltage characteristic without a photocoupler. This technique takes advantage of a voltage generated, in proportion to an output voltage, on an auxiliary winding provided in a transformer. Based on the generated voltage, this technique controls a switching element and achieves the constant voltage characteristic.

In the technique described in Patent Reference 2, the auxiliary winding generating a voltage in proportion to an output voltage exercises the function (i). The auxiliary winding can also exercise the function (ii), working with a secondary winding placed in the transformer. The function (iii) is exercised by a pulse width modulation (PWM) control integrated circuit (IC).

This technique, however, faces a following problem: a spike voltage occurs in a voltage on the auxiliary winding immediately after the switching element is turned off. This generated spike voltage deteriorates the proportionality between the output voltage and the auxiliary winding voltage. In addition, the spike voltage changes as an output power changes. Thus, the technique has a disadvantage in that accuracy of the output voltage deteriorates when the output power changes. In other words, the technique likely shows deterioration of the constant voltage characteristic due to poor accuracy in detecting an output voltage described in the function (i).

Then, formulated was another technique which does not require a photocoupler. Patent Reference 3 (Japanese Unexamined Patent Application Publication No. 2004-229437) describes the technique. In this technique, focused is a secondary-side conduction time period T2on representing a period during which a current flows into a secondary winding. This technique employs a relationship determined among the time period T2on, an output voltage, and a peak value of a primary current waveform. Here, the primary current is a current flowing into a switching element. Specifically, the technique changes the peak value of the primary current waveform so that the relationship is determined with the output voltage remained constant. Accordingly, a constant voltage characteristic is achieved.

In the technique described in Patent Reference 3, the above functions (i), (ii), and (iii) are exercised as follows: the function (i) is exercised in the secondary-side conduction time period T2on; the function (ii) is exercised through detection of the secondary-side conduction time period T2on using a voltage appearing on either a primary winding of a transformer or an auxiliary winding of the transformer; the function (iii) is exercised through a change of the peak value of the primary current waveform.

Specifically described here is detection of the output voltage; namely, the function (i). The technique employs the secondary-side conduction time period T2on to detect the output voltage, which is based on Equation 1 below.

$$VO=(Ns/Np) \times (Lp \times Ipp/T2on) - VF \qquad \text{(Equation 1)}$$

Here, VO is an output voltage, Ns is the number of turns of a secondary winding, Np is the number of turns of the primary winding, Lp is an inductance value of the primary winding, VF is a forward voltage of a secondary-side rectification diode, T2on is the secondary-side conduction time period, and Ipp is a primary current peak value.

Since Equation 1 holds, if the secondary-side conduction time period T2on can be detected, the output voltage VO can be estimated in the case where Ns, Np, Lp, Ipp, and VF are definite. Premised on the basis that Ns, Np, and Lp are constant and definite, this example involves executing control to cause Ipp and T2on to proportionally change. Accordingly, detection of the output voltage VO and an adjustment of supplied energy are executed through a change of Ipp.

SUMMARY OF THE INVENTION

The technique described in the above Patent Reference 3 shows that Ipp, which is a parameter included in Equation 1 used for detecting the output voltage VO, changes as the output power changes. Specifically, T2on changes, following the change of Ipp occurring according to according to changes of the output power and the output current. Here, VO should be detected with Equation 1 satisfied.

Actually, a control circuit needs to execute control to cause Ipp to proportionally change with respect to a detected value of T2on. Accuracy controlled by the control circuit affects accuracy of detecting the output voltage when the output current changes. Consequently, the proportional relationship affects regulation accuracy of the output current.

Hence, in order to exercise the control described in the above Patent Reference 3, the control circuit is required to accurately develop the proportionality between Ipp and T2on. This is one of the causes to decrease the accuracy of the output voltage.

The present invention is conceived in view of the above problems and has as an object to introduce a switching power supply device and a semiconductor device which are capable of (i) reducing variations of a control circuit in a switching element, and (ii) providing a high-accuracy and stable output voltage.

In order to achieve the above object, a switching power supply device according to an aspect of the present invention includes: an input unit which includes a first input terminal and a second input terminal, and receives an input voltage; a transformer which includes a primary winding and a secondary winding, the primary winding having one end connected to the primary input terminal; an output voltage generating circuit which is connected to the secondary winding, and generates an output voltage by rectifying and smoothing an alternate-current voltage appearing on the secondary winding; an output unit which provides, to a load, the output voltage generated by the output voltage generating circuit; a switching element which includes a first terminal, a second terminal, and a control terminal, the first terminal being connected to an other end of the primary winding, and the second terminal being connected to the second input terminal; a control circuit which is connected to the control terminal, and controls on-off switching of the switching element; and a voltage-corresponding-to-secondary-current detecting unit which provides a first signal having a voltage level corresponding to a secondary current flowing into the secondary winding, wherein the control circuit includes: a secondary-side conduction time period measuring circuit which measures a secondary-side conduction time period based on the voltage level of the first signal provided by the voltage-corresponding-to-secondary-current detecting unit, the secondary-side conduction time period representing a time period in which the secondary current flows; a reference value determining circuit which determines a reference value of the secondary-side conduction time period; a frequency control circuit which provides a second signal used for changing an on-frequency of the switching element in order to narrow a difference between (i) the secondary-side conduction time period measured by the secondary-side conduction time period measuring circuit and (ii) the reference value determined by the reference value determining circuit; a primary current detecting circuit which detects a primary current flowing into the primary winding; a current threshold value determining circuit which determines a first threshold value of the primary current; a current comparing circuit which compares the primary current with the first threshold value to provide a third signal used for turning the switching element off when the primary current becomes equal to the first threshold value, the primary current being detected by the primary current detecting circuit, and the first threshold value being determined by the current threshold value determining circuit; and an oscillation control circuit which controls on-off switching of the switching element according to the second signal and the third signal.

Since the above structure allows the switching element to turn off when the primary current becomes equal to the first threshold value, the switching power supply device can make the maximum value of the primary current constant at the first threshold value. Furthermore, the above structure allows the on-frequency of the switching element to change according to a slight change in secondary-side conduction time period. Thus, the switching power supply device can adjust an output power without changing the parameters shown in Equation 1. Hence, the switching power supply device can (i) reduce variations of the control circuit included in the switching element, and (ii) provide a high-accuracy and stable output voltage. In other words, the present invention can provide a switching power supply device having a constant voltage characteristic with excellent accuracy.

The secondary-side conduction time period measuring circuit may further provide a fourth signal having a voltage level corresponding to the measured secondary-side conduction time period. The reference value determining circuit may further provide a fifth signal having a voltage level corresponding to the determined reference value. The frequency control circuit may include: an error amplifier which amplifies a difference between the fourth signal and the fifth signal, and provides a sixth signal indicating the amplified difference; and a frequency modulating circuit which provides the second signal so that the on-frequency becomes greater as the sixth signal provided by the error amplifier is greater.

The above structure allows the switching power supply device to employ a simple structure to adjust an output power while maintaining the secondary-side conduction time period approximately constant.

When the on-frequency decreases to a third threshold value in a first state in which the first threshold value of the primary current is set to a first current value, the current threshold value determining circuit may discontinuously decrease the first threshold value of the primary current to a second current value which is smaller than the first current value, and the frequency control circuit may increase the on-frequency when the first threshold value of the primary current decreases to the second current value.

This structure allows the maximum value of the primary current to decrease when the switching power supply device is operating with a low oscillation frequency. Accordingly, noise caused by a mounted part, such as a transformer, can be reduced.

When the on-frequency increases to a fourth threshold value in a second state in which the first threshold value of the primary current is set to the second current value, the current threshold value determining circuit may increase the first threshold value of the primary current to the first current value, the fourth threshold value being different from the third threshold value, and the frequency control circuit may decrease the on-frequency when the first threshold value of the primary current increases to the first current value.

This structure allows an oscillation operation of the switching element to stabilize.

The frequency control circuit and the current threshold value determining circuit may respectively change the on-frequency and the primary current so that, in the first state, a same amount of energy is supplied to the output unit immediately before and after the first threshold value of the primary current decreases to the second current value.

This structure keeps discontinuity from occurring in a change in supply energy when an output current change. Accordingly, the switching power supply device can provide a stable output voltage.

The frequency control circuit and the current threshold value determining circuit may respectively change the on-frequency and the primary current, so that, in the first state, energy which is supplied to the output unit immediately before the first threshold value of the primary current decreases to the second current value is greater than energy which is supplied to the output unit immediately after the first threshold value of the primary current decreases to the second current value.

This structure allows a resistance component of a cable to decrease the reduction of the output voltage on an output edge of the transformer when the cable is connected to the output unit, for example.

The switching power supply device may further include an input voltage detecting unit which detects the input voltage, wherein the voltage-corresponding-to-secondary-current detecting unit may be connected to the first terminal of the switching element, and provide, as the first signal, a signal having a voltage level which is based on a voltage of the first terminal of the switching element, and the secondary-side conduction time period measuring circuit may detect, as the secondary-side conduction time period, a time period in which the voltage detected by the voltage-corresponding-to-secondary-current detecting unit is higher than the voltage detected by the input voltage detecting unit, the secondary-side conduction time period being detected after the switching element turns off.

In order to achieve the above object, a switching power supply device according to another aspect of the present invention includes: an input unit which includes a first input terminal and a second input terminal, and receives an input voltage; a transformer which includes a primary winding and a secondary winding, the primary winding having one end connected to the primary input terminal; an output voltage generating circuit which is connected to the secondary winding, and generates an output voltage by rectifying and smoothing an alternate-current voltage appearing on the secondary winding; an output unit which provides, to a load, the output voltage generated by the output voltage generating circuit; a switching element which includes a first terminal, a second terminal, and a control terminal, the first terminal being connected to an other end of the primary winding, and the second terminal being connected to the second input terminal; a control circuit which is connected to the control terminal and controls on-off switching of the switching element; a voltage-corresponding-to-secondary-current detecting unit which provides a first signal having a voltage level corresponding to a secondary current flowing into the secondary winding; and an input voltage detecting unit which detects the input voltage, wherein the control circuit includes: a secondary-side conduction time period measuring circuit which measures a secondary-side conduction time period based on the voltage level of the first signal provided by the voltage-corresponding-to-secondary-current detecting unit, the secondary-side conduction time period representing a time period in which the secondary current flows; a primary current detecting circuit which detects a primary current flowing into the primary winding; a switching determining circuit which controls on-off switching of the switching element in order to keep proportionality between (i) the primary current flowing into the primary winding and (ii) the secondary-side conduction time period representing a time period in which the secondary current flows; a gradient detecting circuit which detects a change of the primary current per unit time detected by the primary current detecting circuit; and an inductance predicting circuit which predicts an inductance value of the primary winding by employing (i) the input voltage detected by the input voltage detecting unit, and (ii) a change of the primary current per unit time detected by the primary current detecting circuit, wherein, depending on a magnitude of the inductance value predicted by the inductance predicting circuit, the switching determining circuit changes a proportionality coefficient in the proportionality between (i) the primary current flowing into the primary winding and (ii) the secondary-side conduction time period representing the time period in which the secondary current flows.

According to the above structure, the switching determining circuit controls the on-off switching of the switching element in order to keep proportionality between (i) the primary current flowing into said primary winding and (ii) the secondary-side conduction time period representing the time period in which the secondary current flows. Here, depending on the magnitude of the inductance value of the primary winding predicted by the inductance predicting circuit, the switching determining circuit changes the proportionality coefficient in the proportionality. Thus, the switching determining circuit can reduce an influence, caused by the secondary-side conduction time period, of variations in inductance value of the primary winding on detection accuracy of the output voltage.

The switching determining circuit may include: a reference value determining circuit which determines a reference value of the secondary-side conduction time period; a frequency control circuit which provides a second signal used for changing an on-frequency of the switching element in order to narrow a difference between (i) the secondary-side conduction time period measured by the secondary-side conduction time period measuring circuit and (ii) the reference value determined by the reference value determining circuit; a current threshold value determining circuit which determines a first threshold value of the primary current; a current comparing circuit which compares the primary current with the first threshold value to provide a third signal used for turning the switching element off when the primary current becomes equal to the first threshold value, the primary current being detected by the primary current detecting circuit, and the first threshold value being determined by the current threshold value determining circuit; and an oscillation control circuit which controls on-off switching of the switching element according to the second signal and the third signal.

The reference value determining circuit may determine the reference value, so that the inductance value which is predicted by the inductance predicting circuit (i) increases when the inductance value is greater than a second threshold value, and (ii) decreases when the inductance value is smaller than the second threshold value.

This structure can reduce an influence, caused by the secondary-side conduction time period, of variations in inductance value of the primary winding on detection accuracy of the output voltage.

The current threshold value determining circuit may determine the first threshold value, so that the inductance value which is predicted by the inductance predicting circuit (i) increases when the inductance value is greater than a second threshold value, and (ii) decreases when the inductance value is smaller than the second threshold value.

This structure can reduce an influence, caused by the secondary-side conduction time period, of variations in inductance value of the primary winding on detection accuracy of the output voltage.

The switching determining circuit may include: a frequency setting circuit which provides a second signal used for turning the switching element on at a constant cycle; a current threshold value determining circuit which determines a first threshold value of the primary current according to the secondary-side conduction time period; a current comparing circuit which compares the primary current with the first threshold value to provide a third signal used for turning the switching element off when the primary current becomes equal to the first threshold value, the primary current being detected by the primary current detecting circuit, and the first threshold being determined by the current threshold value determining circuit; and an oscillation control circuit which controls on-off switching of the switching element according to the second signal and the third signal.

The current threshold value determining circuit may further include a trimming circuit which trims the first threshold value of the primary current, and the reference value determining circuit may further include a trimming circuit which trims the reference value.

This structure can reduce variations in reference value of the secondary-side conduction time period and in maximum value of the primary current. Accordingly, variations in detection accuracy of the output voltage are reduced, the variations which are caused by the secondary-side conduction time period. Hence, a stable output voltage can be provided.

A semiconductor device according to an aspect of the present invention includes the control circuit, wherein at least a part of the control circuit may be formed on a single semiconductor substrate.

This structure makes possible saving a manufacturing cost and space since at least a part of a circuit included in the control circuit of the switching element is formed on a single semiconductor substrate.

Furthermore, the switching element may be formed on the single semiconductor substrate.

This structure makes possible further saving a manufacturing cost and space since the switching element and the control circuit are formed on a single semiconductor substrate.

A method of trimming according to another aspect of the present invention performed by the switching power supply device includes: trimming, so that a variation range of a ratio of (i) the first threshold value of the primary current to (ii) the reference value of the secondary-side conduction time period is reduced.

This trimming allows variations in ratio of (i) the reference value of the secondary-side conduction time period to (ii) the maximum value of the primary current. Accordingly, variations in detection accuracy of the output voltage are reduced, the variations which are caused by the secondary-side conduction time period. Thus, variations in output voltage can be reduced.

A method of presenting a specification according to an aspect of the present invention is a method of presenting a specification for the switching power supply device. The method includes presenting a variation range of a ratio of (i) the first threshold value of the primary current to (ii) the reference value of the secondary-side conduction time period to a user as a specification of the semiconductor device.

This presenting allows the user to predict variations in output voltage of the switching power supply device when the user designs the switching power supply device a semiconductor device employing a semiconductor device.

A switching power supply device according to an implementation of the present invention can (i) reduce variations of a control circuit included in a switching element, and (ii) provide a high-accuracy and stable output voltage.

FURTHER INFORMATION ABOUT TECHNICAL BACKGROUND TO THIS APPLICATION

The disclosure of Japanese Patent Application No. 2009-210944 filed on Sep. 11, 2009 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENTS

Described hereinafter in detail are switching power supply devices according to Embodiments of the present invention with reference to the drawings.

Embodiment 1

A switching power supply device according to Embodiment 1 supplies a stable output voltage to a load. The switching power supply device includes the following: a transformer including a primary winding and a secondary winding; a switching element connected in series to the primary winding; and a control circuit which controls on-off switching of the switching element. The control circuit according to Embodiment 1 includes the following: a secondary-side conduction time period measuring circuit; a frequency control circuit; and a current comparing circuit. The secondary-side conduction time period measuring circuit measures a secondary-side conduction time period. The frequency control circuit provides a signal used for changing a frequency when the switching element is on so that the secondary-side conduction time period is equal to a reference value or below. The current comparing circuit provides a signal used for turning the switching element off when a primary current becomes equal to a first threshold.

Specifically, the switching power supply device according to Embodiment 1 is a flyback power supply in which a current flows toward the secondary side while the switching element is off. A feature of the switching power supply device is that the switching supply device (i) turns the switching element off when the primary current becomes equal to the first threshold, and (ii) turns the switching element on with timing at which the difference between the secondary-side conduction time period and the reference value is determined to be small.

Figure 1:
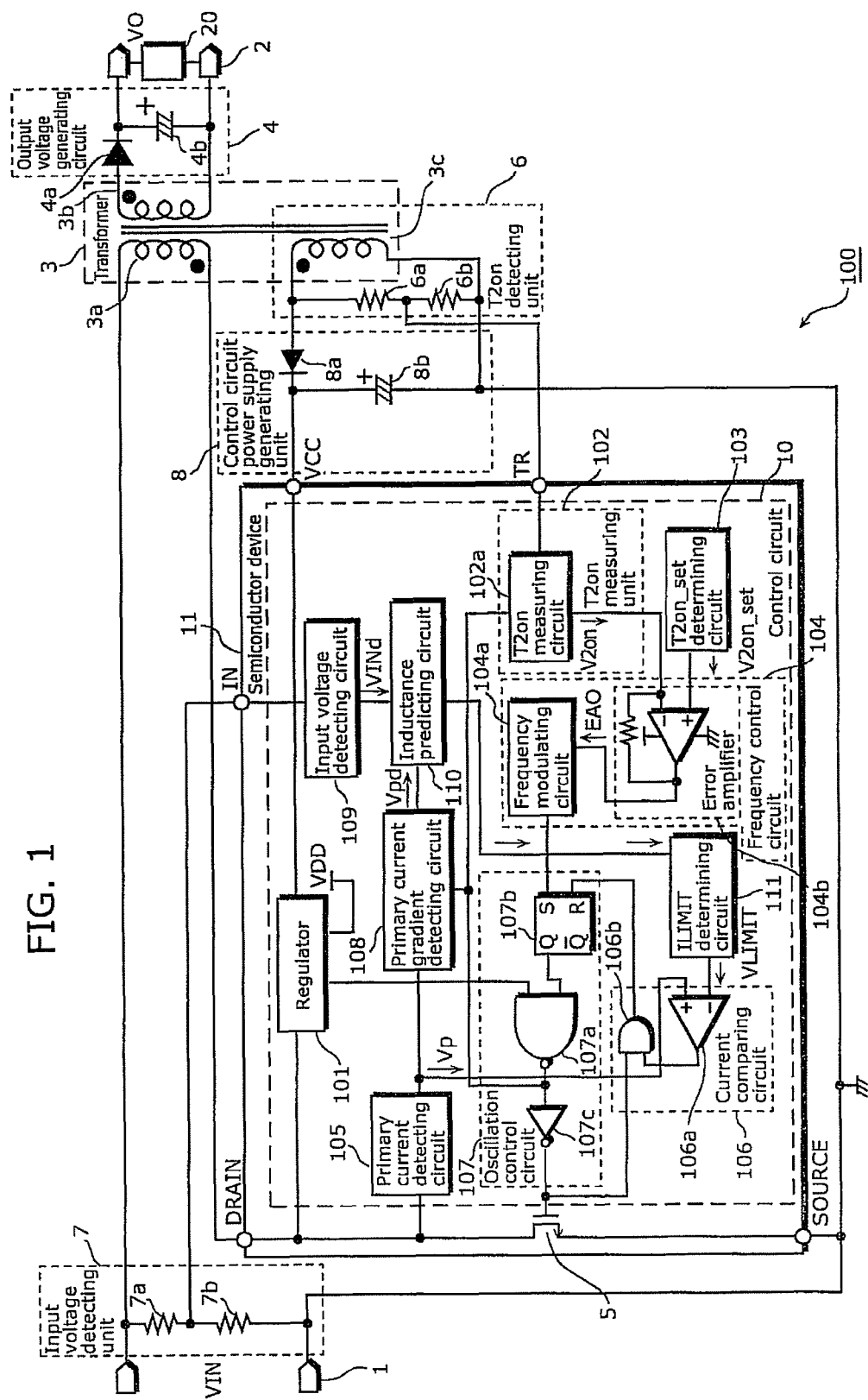
FIG. 1 is a block diagram exemplifying a circuit structure of a switching power supply device according to Embodiment 1.

FIG. 1 is a block diagram exemplifying a circuit structure of a switching power supply device 100 according to Embodiment 1. The switching power supply device 100 shown in FIG. 1 includes the following: an input unit 1; an output unit 2; a transformer 3; an output voltage generating circuit 4; a switching element 5; a T2on detecting unit 6; an input voltage detecting unit 7; a control circuit power supply generating unit 8; and a control circuit 10.

As shown in FIG. 1, the switching element 5 and the control circuit 10 are included in a semiconductor device 11 used for controlling the switching power supply device 100. The semiconductor device 11 has five terminals as external input terminals: an input terminal (DRAIN terminal) of the switching element 5; an auxiliary power supply voltage input terminal (VCC terminal); a secondary-side conduction time period detecting terminal (TR terminal); an input voltage detecting terminal (IN terminal); and a GND terminal of the control circuit 10 (SOURCE terminal). Here, the GND terminal also works as an output terminal for the switching element 5.

The input unit 1 included in the switching power supply device 100 has two input terminals. A direct-current (DC) input voltage VIN is applied between the two input terminals.

The output unit 2 provides the output voltage VO to supply power to a load 20. The object of the switching power supply device 100 according to Embodiment 1 is to provide a stable output voltage VO from the output unit 2 regardless of the magnitude of the load 20.

The transformer 3 includes a primary winding 3a, a secondary winding 3b, and an auxiliary winding 3c. The primary winding 3a and the secondary winding 3b are opposite in polarity, and the switching power supply device 100 is a flyback power supply device. In other words, the switching power supply device 100 is structured to have a current flow into the secondary winding 3b in a period during which the switching element 5 is off. The auxiliary winding 3c and the secondary winding 3b are the same in polarity.

One end of the primary winding 3a is connected to one of the input terminals included in the input unit 1 via the input voltage detecting unit 7. The other end of the primary winding 3a is connected to the DRAIN terminal. The secondary winding 3b is connected to the output unit 2 via the output voltage generating circuit 4. The auxiliary winding 3c is connected to the control circuit power supply generating unit 8.

The output voltage generating circuit 4 is a rectification smoothing circuit including a diode 4a and a capacitor 4b, and generates the output voltage VO of the switching power supply device 100. In other words, the output voltage generating circuit 4 (i) generates a DC output voltage VO by rectifying and smoothing an alternate-current (AC) voltage (secondary-side AC voltage) generated on the secondary winding 3b through an switching operation of the switching element 5, and (ii) provides the generated output voltage VO to the output unit 2.

The switching element 5 is connected to the primary winding 3a in series. For example, the switching element 5 includes the following: a first terminal connected to the primary winding 3a via the DRAIN terminal; a second terminal connected to the other input terminal of the input unit 1 via the SOURCE terminal; and a control terminal connected to the control circuit 10. Specifically, the switching element 5 is a Metal Oxide Semiconductor (MOS) field-effect transistor (hereinafter referred to as FET). The drain and the source of the FET are respectively connected to the DRAIN terminal and the SOURCE terminal. The gate of the FET is connected to the control circuit 10.

The T2on detecting unit 6 includes the above auxiliary winding 3c, and resistors 6a and 6b, and provides voltage changes to the TR terminal of the semiconductor device 11, the voltage change which is proportional to an AC voltage appearing on the auxiliary winding 3c. In other words, the T2on detecting unit 6 is an example of a voltage-corresponding-to-secondary-current detecting unit which provides a first signal to the TR terminal. The first signal has a voltage level corresponding to a secondary current flowing into the secondary winding 3b. One end of the auxiliary winding 3c is connected to one end of the resistor 6a. The other end of the resistor 6a is connected to one end of the resistor 6b. The other end of the resistor 6b is connected to the other end of the auxiliary winding 3c. Furthermore, connection points of the resistors 6a and 6b are connected to the TR terminal.

The input voltage detecting unit 7 includes resistors 7a and 7b, and provides a voltage to the IN terminal of the semiconductor device 11. Here, the voltage is proportional to an input voltage VIN which is a DC voltage applied to the input unit 1. One end of the resistor 7a is connected to one end of the primary winding 3a. The other end of the resistor 7a is connected to one end of the resistor 7b. The other end of the resistor 7b is grounded. Furthermore, connection points of the resistors 7a and 7b are connected to the IN terminal.

The control circuit power supply generating unit 8 is a rectification smoothing circuit including a diode 8a and capacitor 8b, and works as an auxiliary power supply unit for the semiconductor device 11. In other words, the control circuit power supply generating unit 8 supplies power to the semiconductor device 11 by rectifying and smoothing an AC voltage (auxiliary-side alternating voltage) generated on the auxiliary winding 3c through the switching operation of the switching element 5.

The control circuit 10 controls the switching operation; that is on-off switching of the switching element 5. Described below are a specific structure and an operation of the control circuit 10.

As shown in FIG. 1, the control circuit 10 includes the following: a regulator 101; a T2on measuring unit 102; a T2on_set determining circuit 103; a frequency control circuit 104; a primary current detecting circuit 105; a current comparing circuit 106; an oscillation control circuit 107; a primary current gradient detecting circuit 108; an input voltage detecting circuit 109; an inductance predicting circuit 110; and an ILIMIT determining circuit 111.

The regulator 101 supplies a current from one of the DRAIN terminal and the VCC terminal to an internal circuit power supply VDD included in the semiconductor device 11, and stabilizes a voltage in the internal circuit power supply VDD at a constant value. For example, the VDD voltage is kept at a constant value using the following technique.

Before the switching operation of the switching element 5 starts, the regulator 101 supplies a current from the DRAIN terminal to the internal circuit power supply VDD in order to increase the voltage of the internal circuit power supply VDD. Furthermore, the regulator 101 also supplies a current to the capacitor 8b included in the control circuit power supply generating unit 8 via the VCC terminal in order to increase the voltage of an auxiliary power supply voltage VCC.

When the auxiliary power supply voltage VCC reaches a threshold value VCC (ON), an output signal provided to a NAND circuit 107a included in the oscillation control circuit 107 switches from a low level (low-level signal) to a high level (high-level signal). The switching activates the switching operation of the switching element 5.

Simultaneously, the regulator 101 suspends supply of a current provided from the DRAIN terminal to the VCC terminal, and starts to supply a current from the VCC terminal to the internal circuit power supply VDD. The suspension and start of the current supply provides power to the output voltage VO, and further supplies power from the auxiliary winding 3c and the control circuit power supply generating unit 8 to the auxiliary power supply voltage VCC.

The regulator 101 supplies a current from the VCC terminal to the internal circuit power supply VDD to reduce consumption power of the semiconductor device 11. Moreover, when the auxiliary power supply voltage VCC goes below a threshold value VCC (OFF), such as when the output voltage VO decreases in electrical overload, the regulator 101 again supplies the current from the DRAIN terminal to the internal circuit power supply VDD.

The T2on measuring unit 102; namely a secondary-side conduction time period measuring unit, (i) includes a T2on measuring circuit 102a measuring a secondary-side conduction time period T2on representing a time period in which a secondary current flows into the secondary winding 3b, and (ii) provides a voltage signal exemplifying a fourth signal having a voltage level corresponding to the secondary-side conduction time period T2on. For example, the T2on measuring unit 102 provides a signal V2on indicating a greater voltage value as the secondary-side conduction time period T2on is greater.

The T2on measuring circuit 102a receives a voltage signal (first signal) proportional to an AC voltage. Here, the AC voltage (hereinafter referred to as an auxiliary winding voltage VB) is provided from the T2on detecting unit 6 and appears on the auxiliary winding 3c via the TR terminal. Specifically, the resistors 6a and 6b divide the auxiliary winding voltage VB and provide the divided voltages to the T2on measuring circuit 102a. The T2on measuring circuit 102a (i) measures a time period between the switching element 5 turning off and the incoming voltage to the TR terminal becoming 0, and (ii) provides a voltage signal proportional to the measured time period to the frequency control circuit 104. In other words, the voltage level of the provided signal V2on is proportional to the secondary-side conduction time period T2on.

The T2on_set determining circuit 103 exemplifies a reference value determining circuit determining a reference value of the secondary-side conduction time period T2on. The T2on_set determining circuit 103 provides a V2on_set signal exemplifying a fifth signal having a voltage level corresponding to the determined reference value. Here, the relationship between the determined reference value and the voltage level of the V2on_set signal is the same as, for example, that between the secondary-side conduction time period T2on and the signal V2on. In other words, when the determined reference value is equal to T2on, the V2on_set signal and the signal V2on have the same voltage level.

The frequency control circuit 104 includes a frequency modulating circuit 104a and an error amplifier 104b, and determines an on-frequency of the switching element 5. Specifically, the frequency control circuit 104 provides a CLOCK signal exemplifying a second signal used for changing the on-frequency of the switching element 5 in order to narrow the difference between the secondary-side conduction time period T2on and the reference value T2on_set. The reference value T2on_set is determined by the T2on_set determining circuit 103.

For example, the frequency control circuit 104 provides the CLOCK signal used for changing the on-frequency of the switching element 5 in order to either equalize T2on and T2on_set or narrow the difference therebetween.

The error amplifier 104b compares the V2on_set signal (fifth signal) provided from the T2on_set determining circuit 103 with an output signal V2on (fourth signal) of the T2on measuring circuit 102a. Then, the error amplifier 104b (i) calculates the difference between the V2on_set signal and the signal V2on and (ii) provides a signal with the calculated difference amplified to the frequency modulating circuit 104a. Here, the amplified signal is a sixth signal exemplifying the output signal EAO. In other words, the error amplifier 104b (i) compares the reference value determined by the T2on_set determining circuit 103 with T2on measured by the T2on measuring circuit 102a, and (ii) provides the signal EAO having a larger voltage level as the difference between T2on and the reference value is greater.

The frequency modulating circuit 104a provides to the oscillation control circuit 107 a pulse signal, periodically repeating a hi-level and a low-level, as the CLOCK signal. The frequency modulating circuit 104a modulates a cycle of the CLOCK signal according to the output signal EAO provided from the error amplifier 104b. Specifically, the frequency modulating circuit 104a modulates the cycle of the CLOCK signal, so that, while the switching element 5 is off, the time period between the voltage on the TR terminal falling to 0 and the CLOCK signal going hi-level is changed based on the output signal EAO. For example, the frequency modulating circuit 104a provides the CLOCK signal as the second signal, so that the on-frequency of the switching element 5 becomes greater as the signal EAO, exemplifying the sixth signal, is greater.

The primary current detecting circuit 105 (i) detects a current (primary current) flowing into the primary winding 3a and the switching element 5, and (ii) provides to the current comparing circuit 106 a signal Vp which is based on a current value of the detected current. For example, the primary current detecting circuit 105 provides the signal Vp of which voltage level is proportional to the current value of the primary current.

The current comparing circuit 106 includes a comparator 106a and an AND circuit 106b, and provides to the oscillation control circuit 107 a signal used for turning off the switching element 5 according to magnitude of the primary current. Specifically, the current comparing circuit 106 compares the primary current detected by the primary current detecting circuit 105 with a predetermined threshold value (ILIMIT described hereinafter) determined by the ILIMIT determining circuit 111. When the primary current becomes equal to the predetermined threshold value (ILIMIT described hereinafter), the current comparing circuit 106 provides a third signal used for turning the switching element 5 off.

The comparator 106a compares an output VLIMIT of the ILIMIT determining circuit 111 with an output Vp of the primary current detecting circuit 105. The comparator 106a provides to the AND circuit 106b (i) a low-level signal when Vp<VLIMIT, and (ii) a high-level signal when Vp≧VLIMIT.

The AND circuit 106b (i) performs a logical AND operation on the outputs of the comparator 106a and the oscillation control circuit 107, and (ii) provides, as the third signal, the resulting signal of the logical AND operation to a RESET terminal disposed on an RS flip-flop 107b included in the oscillation control circuit 107.

According to the second signal (CLOCK signal) provided from the frequency control circuit 104 and the third signal provided from the current comparing circuit 106, the oscillation control circuit 107 controls on-off switching of the switching element 5. Specifically, the oscillation control circuit 107 (i) includes a NAND circuit 107a, the RS flip-flop 107b, and a gate driver 107c, (ii) is connected to a control terminal (here, a gate terminal) of the switching element 5, and (iii) controls the on-off switching of the switching element 5.

The RS flip-flop 107b receives (i) the CLOCK signal, on a SET terminal, provided from the frequency modulating circuit 104a, and (ii) a signal, on a RESET terminal, provided from the AND circuit 106b. Here, the signal on the RESET terminal is based on the control result of the primary current. Based on the signals provided to the SET terminal and the RESET terminal, the RS flip-flop 107b provides a signal to the NAND circuit 107a.

The NAND circuit 107a causes the gate driver 107c to switch the switching element 5 by (i) performing a negative AND operation on the outputs of the regulator 101 and the RS flip-flop 107b, and (ii) providing to the gate driver 107c a resulting signal of the negative AND operation.

Consequently, the oscillation control circuit 107 is structured so that the switching element 5 (i) turns on with timing at which the CLOCK signal is provided from the frequency modulating circuit 104a, and (ii) turns off with timing at which the input signal of the comparator 106a represents Vp=VLIMIT.

The primary current gradient detecting circuit 108 receives the output Vp of the primary current detecting circuit 105. Then, the primary current gradient detecting circuit 108 detects the output Vp in Tdet-time period since the turn-on of the switching element 5, and provides the detected value as Vpd to the inductance predicting circuit 110. In other words, the primary current gradient detecting circuit 108 detects, as gradient of the primary current, a change of the primary current per unit time period detected by the primary current detecting circuit 105.

The input voltage detecting circuit 109 (i) receives a voltage which is proportional to the input voltage VIN and provided from the input voltage detecting unit 7, and (ii) provides to the inductance predicting circuit 110 an output signal VINd which is based on the input signal. For example, the output signal VINd is proportional to the input voltage VIN in voltage level.

The inductance predicting circuit 110 predicts an inductance value of the primary winding 3a employing the input voltage detected by the input voltage detecting circuit 109 and the gradient of the primary current detected by the primary current gradient detecting circuit 108. Specifically, the inductance predicting circuit 110 has Vpd_set which is a reference value of Vpd changing according to VINd. When a provided Vpd value is greater than Vpd_set, the inductance predicting circuit 110 provides to the ILIMIT determining circuit 111 a signal increasing VLIMIT. On the contrary, when the provided Vpd value is smaller than Vpd_set, the inductance predicting circuit 110 provides to the ILIMIT determining circuit 111 a signal decreasing VLIMIT.

The ILIMIT determining circuit 111 exemplifies a current threshold value determining circuit determining a first threshold of the primary current; that is, the greatest value of the primary current. Specifically, the ILIMIT determining circuit 111 changes VLIMIT according to the signal provided from the inductance predicting circuit 110. As described above, the oscillation control circuit 107 is structured to turn off the switching element 5 with timing in which Vp=VLIMIT holds. Thus, VLIMIT is a threshold value used to determine the peak value Ipp of the primary current.

It is noted that Embodiment 1 shows a switching determining circuit including the T2on_set determining circuit 103, the frequency control circuit 104, the ILIMIT determining circuit 111, the current comparing circuit 106, and the oscillation control circuit 107. Here, the switching determining circuit controls on-off switching of the switching element 5 in order to keep the proportionality between (i) the primary current flowing into the primary winding 3a, and (ii) the secondary-side conduction time period representing a time period in which the secondary current flows. Depending on a magnitude of the inductance value predicted by the inductance predicting circuit 110, the switching determining circuit changes a proportionality coefficient in the proportionality between the primary current flowing into the primary winding 3a and the secondary-side conduction time period representing the time period in which the secondary current flows.

Described next is a switching operation of the switching power supply device 100 structured above. First, an operation to measure the secondary-side conduction time period T2on is described.

Figure 2:
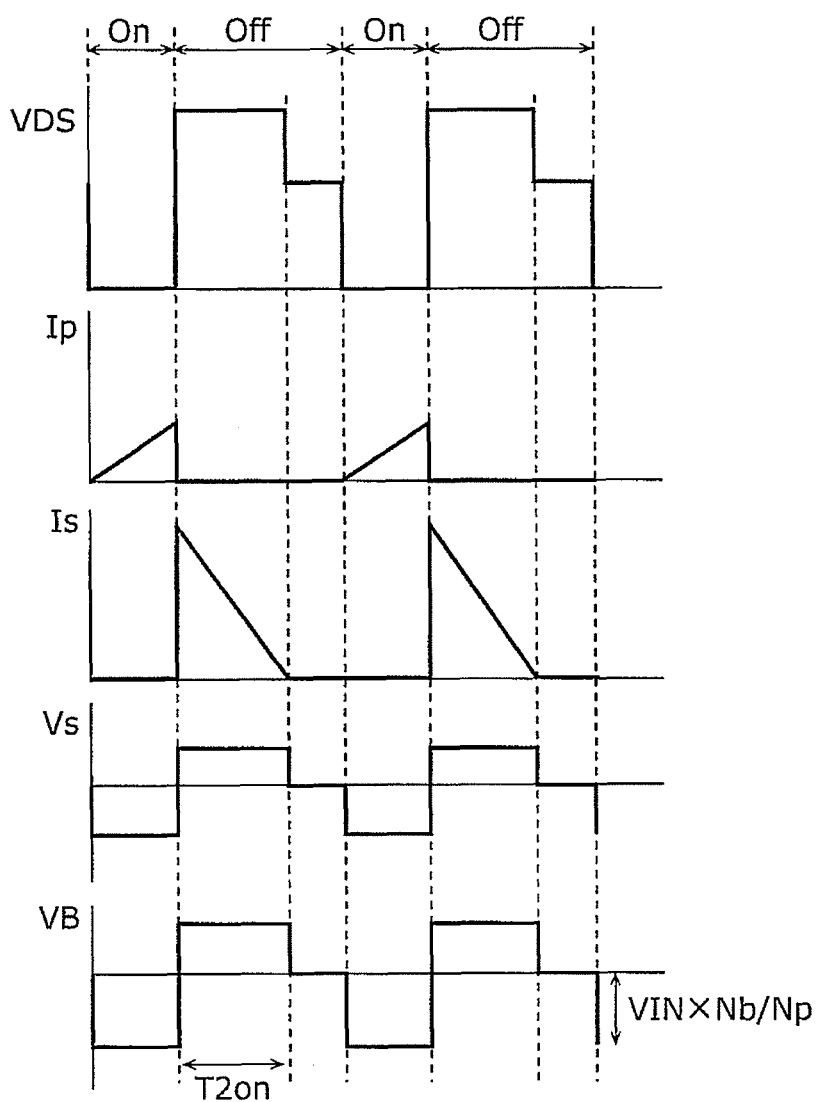
FIG. 2 shows a current and a voltage appearing on each element when the switching power supply device according to Embodiment 1 is in operation.

FIG. 2 shows a current and a voltage appearing on each element when the switching power supply device 100 according to Embodiment 1 is in operation. Specifically, shown in FIG. 2 is each time change of the following when the switching element 5 is in operation: a drain-source voltage VDS of the switching element 5; a primary current Ip flowing into the primary winding 3a; a secondary current Is flowing into the secondary winding 3b; a secondary winding voltage Vs appearing on the secondary winding 3b; and the auxiliary winding voltage VB appearing on the auxiliary winding 3c. Here, each time change is in the switching power supply device 100 which is a flyback power supply.

As shown in FIG. 2, when the switching element 5 is in the on-period, the drain-source voltage VDS falls to zero, and the primary current Ip flows. The flow of the primary current Ip induces a negative voltage on the secondary winding 3b and the auxiliary winding 3c. Here, the secondary winding 3b is connected to the diode 4a. Thus, no negative current flows, and the secondary current Is is kept zero ampere.

Then, when the switching element 5 turns off, the secondary current Is starts flowing, and the auxiliary winding 3c provides a positive voltage VB. As soon as the secondary current Is finishes flowing, the auxiliary winding voltage VB falls to zero voltage.

The secondary-side conduction time period T2on represents a period in which the secondary current Is is flowing. Hence, the secondary-side conduction time period T2on can be measured through measurement of a time period in which the switching element 5 is off; that is, the time period between (i) the auxiliary winding voltage VB going positive, and (ii) the auxiliary winding voltage VB falling to zero. As described above, the T2on measuring circuit 102a receives the voltage proportional the auxiliary winding voltage VB via the TR terminal. Thus, the T2on measuring circuit 102a can measure, as the secondary-side conduction time period T2on, a time period between the provided voltage going positive and falling to zero.

As described above, the error amplifier 104b compares the V2on_set signal provided from the T2on_set determining circuit 103 with the output signal V2on of the T2on measuring circuit 102a, amplifies the difference therebetween, and provides the difference as the signal EAO. Specifically, the output signal EAO is set to be positive when V2on becomes greater than V2on_set.

Described next is a relationship between the output signal EAO, the on-frequency of the switching element 5, and the peak value of the primary current.

Figure 3A:
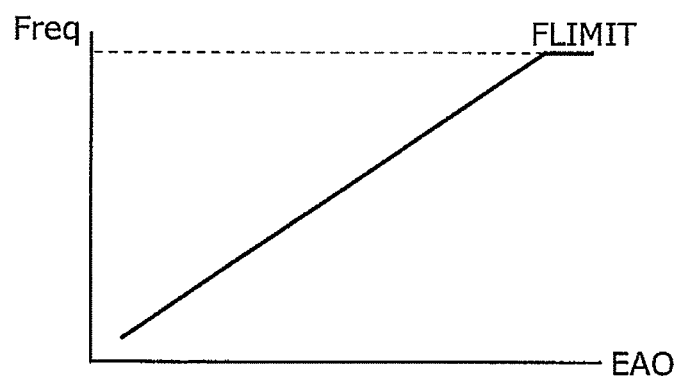
FIG. 3A exemplifies a relationship between an output signal EAO of an error amplifier and an oscillatory frequency Freq of a switching element according to Embodiment 1.

FIG. 3A exemplifies a relationship between the output signal EAO of the error amplifier 104b and the oscillatory frequency of the switching element 5.

As shown in FIG. 3A, the frequency modulating circuit 104a provides the CLOCK signal so that the oscillatory frequency Freq of the switching element 5 becomes greater as the signal EAO becomes greater. In other words, the frequency modulating circuit 104a provides the CLOCK signal to the oscillation control circuit 107 so that the frequency of the CLOCK signal becomes greater as the signal EAO is greater; that is, as the difference between T2on and the reference value is greater.

The greater the difference between T2on and the reference value becomes, the greater the frequency of the CLOCK signal becomes. In other words, the switching element 5 turns on sooner. Hence, the grater oscillatory frequency prevents supply energy from decreasing and stabilizes the output voltage VO.

Figure 3B:
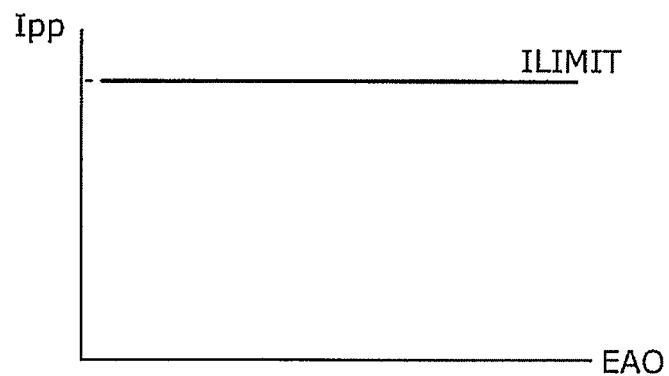
FIG. 3B exemplifies a relationship between the output signal EAO of the error amplifier and a peak value Ipp of a primary current according to Embodiment 1.

FIG. 3B exemplifies a relationship between the output signal EAO of the error amplifier 104b and the peak value Ipp of the primary current.

As described above, the ILIMIT determining circuit 111 is capable of determining the peak value Ipp of the primary current Ip formed in a triangular waveform using the output signal VLIMIT. However, the ILIMIT determining circuit 111 cannot change the output signal VLIMIT depending on the signal EAO. Accordingly, the peak value Ipp of the primary current shows no change with the signal EAO. Thus, as shown in FIG. 3B, the peak value Ipp of the primary current is a constant value with respect to the signal EAO (hereinafter, the peak value, of the primary current, set by VLIMIT is referred to as ILIMIT).

Studied here is a relationship between the secondary-side conduction time period T2on and the output voltage VO. The gradient of the flowing secondary current Is as shown in FIG. 2 is represented in an equation (VO+VF)/Ls where VF is a forward voltage of the diode 4a, and Ls is the inductance value of the secondary winding 3b. Hence, the relationship between a peak value Isp of the secondary current and the secondary-side conduction time period T2on is expressed in Equation 2 below:

$$Isp = T2on \times (VO+VF)/Ls \quad \text{(Equation 2)}$$

It is noted that VO is an output voltage, Ls is an inductance value of the secondary winding 3b, and VF is a forward voltage of the diode 4a.

Here, Equations 3 and 4 holds as follows:

$$Isp = Ipp \times Np/Ns \quad \text{(Equation 3)}$$

$$Ls = Lp \times Ns^2/Np^2 \quad \text{(Equation 4)}$$

It is noted that Np is the number of turns of the primary winding 3a, Ns is the number of turns of the secondary winding 3b, and Lp is an inductance value of the primary winding 3a.

Hence, the above Equation 1 holds. The switching power supply device 100 takes advantage of the relationships to detect the output voltage VO using the secondary-side conduction time period T2on.

Described next is the case where the output current IO actually changes, with reference to FIGS. 4A to 4C.

Figure 4A:
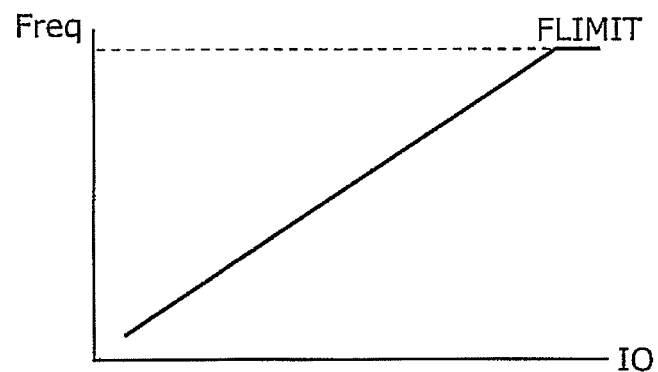
FIG. 4A exemplifies a relationship between an output current IO and the oscillatory frequency Freq of the switching element according to Embodiment 1.

FIG. 4A exemplifies a relationship between the output current IO and the oscillatory frequency Freq according to Embodiment 1. FIG. 4B exemplifies a relationship between the output current IO and the peak value Ipp of the primary current according to Embodiment 1. FIG. 4C exemplifies a relationship between the output current IO and output voltage VO according to Embodiment 1.

The switching power supply device 100 according to Embodiment 1 uses the secondary-side conduction time period T2on to detect (i) a decrease, of the output voltage VO, which occurs when the output current IO increases, and (ii) the decrease amount of the output voltage VO. The magnitude of the detected T2on consequently appears in the output signal EAO of the error amplifier 104b.

For example, when the output current IO increases, the output voltage VO slightly decreases. As Equation 1 shows, the output voltage VO is inversely proportional to the secondary-side conduction time period T2on. When the output voltage VO decreases, the secondary-side conduction time period T2on increases. Accordingly, the difference between the secondary-side conduction time period T2on and a threshold value is widened, and the signal EAO increases. The increased EAO increases the oscillatory frequency Freq and stabilizes the output voltage VO.

Figure 4B:
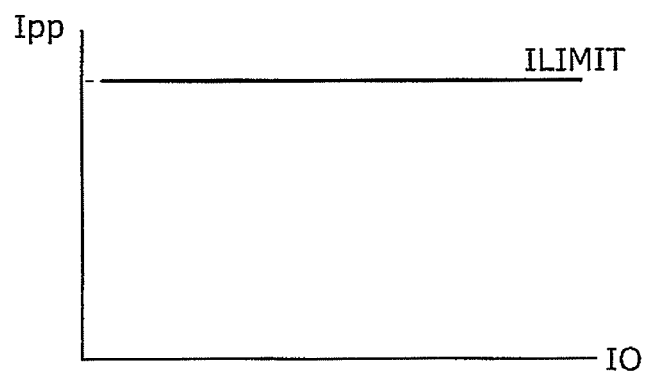
FIG. 4B exemplifies a relationship between the output current IO and the peak value Ipp of the primary current according to Embodiment 1.
Figure 4C:
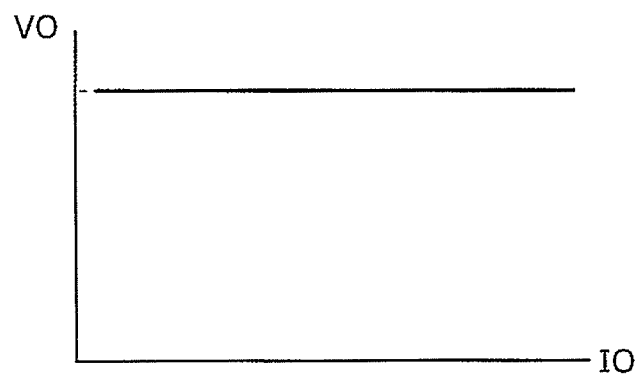
FIG. 4C exemplifies a relationship between the output current IO and output voltage VO according to Embodiment 1.

As described above, the switching power supply device 100 according to Embodiment 1 exercises control to increase the oscillatory frequency Freq with the peak value Ipp of the primary current remaining constant when the output current IO increases as shown in FIGS. 4A and 4B. By setting a gain of the error amplifier 104b high, the switching power supply device 100 can control the oscillatory frequency Freq with the secondary-side conduction time period T2on remaining nearly constant.

As shown in Equation 1 described above, the secondary-side conduction time period T2on inversely proportional to the output voltage VO. The other following parameters are constant with respect to the output current IO: the number of turns of the secondary winding Ns; the number of turns of the primary winding Np; the primary inductance value Lp; the primary current peak value Ipp; and the forward voltage VF of the secondary-side rectification diode. Thus, the constant secondary-side conduction time period T2on in changing the output current IO makes possible remaining the output voltage VO constant as shown in FIG. 4C. As a result, the constant voltage characteristic is achieved.

As described above, the switching power supply device 100 according to Embodiment 1 exercises: the detection of the output voltage VO referred to as (i) by detecting the secondary-side conduction time period T2on; the transfer of a signal in an isolated part referred to as (ii) between the windings included in the transformer 3; and the method for adjusting energy referred to as (iii) by changing the oscillatory frequency Freq.

Another feature of the switching power supply device 100 according to Embodiment 1 is that not all of the values of the parameters in Equation 1, which are used for detecting the output voltage VO, are changed. This feature easily allows the relationship shown in Equation 1 to hold, and makes possible simplifying the control.

Hereinafter, an effect of the switching power supply device 100 according to Embodiment 1 is specifically exemplified with a comparison to a conventional technique described in Patent Reference 3. In order to detect an output voltage with a use of the relationship shown in Equation 1, the technique described in Patent Reference 3 involves changing the peak value Ipp of the primary current according to the secondary-side conduction time period T2on so as to satisfy the following Equation 5 into which Equation 4 is transformed:

$$Ipp = T2on \times (VO + VF) \times (Np/Ns)/LP \qquad \text{(Equation 5)}$$

Here, the output power changes as the peak value Ipp of the primary current changes. Hence, when the output power changes, T2on and Ipp change while maintaining a relationship of Equation 5.

Figure 5:
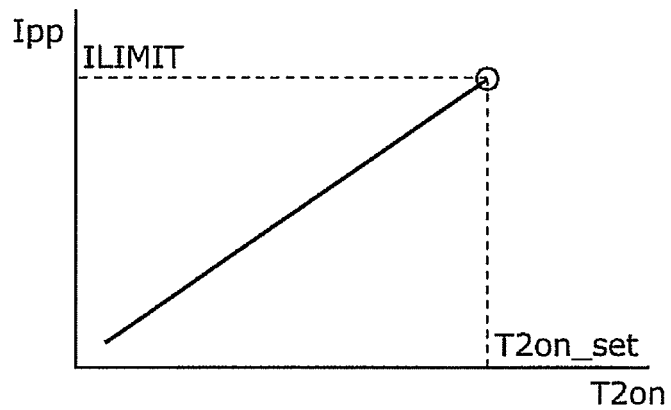
FIG. 5 exemplifies a relationship between a secondary-side conduction time period T2on and the peak value Ipp of the primary current according to Embodiment 1.

FIG. 5 exemplifies a relationship between a secondary-side conduction time period T2on and the peak value Ipp of the primary current in the case where the output voltage VO remains constant.

In order to achieve the technique described in Patent Reference 3, as shown in FIG. 5, a control circuit for a switching element needs to have a characteristic to change the primary current Ipp with respect to the detected secondary-side conduction time period T2on so as to satisfy the relationship shown in FIG. 5. It is this relationship that affects an accuracy of the output voltage VO.

Concurrently, the switching power supply device 100 according to Embodiment 1 exercises control which does not change the peak value Ipp of the primary current. Hence, only two values may be set: ILIMIT set by the control circuit 10 for the switching element 5 as the peak value of the primary current; and the reference value T2on_set of the secondary-side conduction time period. In other words, the switching power supply device 100 eliminates the need of setting the relationship between the two values.

The comparison between the two techniques shows the following: since the technique described in Patent Reference 3 changes Ipp, the technique needs to maintain the relationship between Ipp and T2on, shown in FIG. 5, in all the points of the graph. This maintenance of the relationship affects an accuracy of the output voltage. On the contrary, Embodiment 1 is required to satisfy the relationship between Ipp and T2on at only one point indicated with ILIMIT and T2on_set in the graph.

From a view point of manufacturing a control circuit, it is apparently more difficult to improve the accuracy of the relationship between two values on all the points of the changing two values than to improve the accuracy of the relationship between two values in one point. Since maintaining the relationship shown in Equation 5 improves the accuracy of the output voltage VO, the switching power supply device 100 according to Embodiment 1 is advantageous in improving the output voltage VO.

Furthermore, taking the fact into the consideration that the peak value Ipp of the primary current and the secondary-side conduction time period T2on are respectively controlled by ILIMIT and T2on_on, Equation 1 used for detecting the output voltage VO includes parameters such as Ns, Np, Lp, ILIMIT, and T2on_set. The variations occurring in each parameter affect the accuracy of detecting the output voltage VO. Hence, in order to improve the accuracy of detecting the output voltage VO, the switching element 5 is preferably controlled with the variations in each parameter taken into consideration. Described hereinafter is a method to reduce an effect in variations of the following parameters: the primary inductance value Lp, the maximum value ILIMIT of the primary current, and the reference value T2on_set of the secondary-side conduction time period. These parameters are supposed to cause considerable effects on the accuracy of the detection.

Since the gradient Ap of the triangular waveform of the primary current Ip is expressed as Ap=VIN/Lp (VIN: input voltage), the primary inductance value Lp is expressed as Lp=VIN/Ap. Hence, the primary inductance value Lp can be predicted out of the input voltage VIN and the gradient Ap of the primary current.

The inductance predicting circuit 110 receives from the primary current gradient detecting circuit 108 a signal Vdp which is based on a primary current Ip in Tdet-time since the turn-on of the switching element 5. The input of the signal Vdp means the input of a signal which is based on the gradient Ap of the primary current Ip. In addition, the inductance predicting circuit 110 receives from the input voltage detecting circuit 109 the signal VINd, based on the input voltage VIN. Specifically, the resistors 7a and 7b divide the input voltage VIN and provide the divided voltages as the VINd.

The inductance predicting circuit 110 has a reference value Vdp_set of Vdp which changes based on VINd. When the provided Vdp value is greater than Vdp_set, the inductance predicting circuit 110 determines that the primary inductance value Lp is small, and provides a signal increasing VLIMIT to the ILIMIT determining circuit 111. On the contrary, when the provided Vdp value is smaller than Vdp_set, the inductance predicting circuit 110 determines that the primary inductance value Lp is large, and provides a signal decreasing VLIMIT to the ILIMIT determining circuit 111.

As described above, the peak value Ipp of the primary current decreases when the primary inductance value Lp is large. The peak value Ipp of the primary current increases when the primary inductance value Lp is small. Hence, when the primary inductance value Lp changes, an adjustment of the primary current Ipp according to the change thereof consequently makes possible remaining the secondary-side conduction time period T2on constant.

Figure 6:
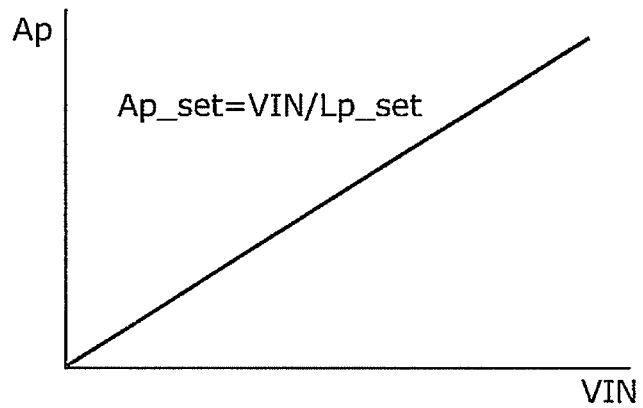
FIG. 6 exemplifies a relationship between an input voltage VIN and a gradient Ap of the primary current according to Embodiment 1.

FIG. 6 exemplifies a relationship between the input voltage VIN and the gradient Ap of the primary current Ip. As shown in FIG. 6, a relationship; that is Ap_set=VIN/Lp_set, is set to hold between (i) an inductance value Lp_set to be used as a reference, and (ii) a reference value Ap_set of Ap. The change of ILIMIT according to the difference between the actually observed gradient value Ap of the primary current and the reference value Ap_set of the gradient value Ap can improve accuracy of the output voltage detection according to Equation 1.

As described above, (i) the prediction of the inductance value according to the input voltage VIN and the gradient Ap of the primary current Ip, and (ii) the change of the value of ILIMIT according to the predicted inductance value improve accuracy of the output voltage detection with Equation 1.

In addition, the ILIMIT determining circuit 111 and the T2on_set determining circuit 103 each includes a trimming circuit, and hence may adjust values of VLIMIT and T2on_set in an inspection process after the semiconductor device 11 is manufactured.

Regarding the semiconductor device 11, one of possible ideas is to focus on a value of ILIMIT/T2on_set, and trim the value in order to reduce variations of the value. Specifically, the ILIMIT value is trimmed first. Then, the T2on_set value is trimmed so that the variations of ILIMIT/T2on_set are reduced.

The above trimming can make a variation range of ILIMIT/T2on_set narrower than trimming simply performed on both of the value. The above trimming technique is also similarly effective when exercised in an opposite order.

When the semiconductor device 11 is put on the market, a magnitude of variations in this ILIMIT/T2on_set is articulated as a specifications value to show performance of the semiconductor device. In other words, the variation range of a ratio of a primary current threshold value to a secondary-side conduction time period reference value may be presented to a user as a specification of the semiconductor device 11.

As described above, the switching power supply device 100 according to Embodiment 1 (i) measures the secondary-side conduction time period T2on to detect the output voltage VO and the output current IO, and (ii) controls an on-frequency of the switching element 5. When the switching power supply device 100 detects the output voltage VO, parameters (including the peak value Ipp of the primary current) other than the secondary-side conduction time period T2on are set to a constant value. This makes possible improving detection accuracy of the output voltage VO. Therefore, the switching power supply device 100 according to Embodiment 1 can reduce variations in the control circuit 10 of the switching element 5, and provide a high-accuracy and stable output voltage.

Embodiment 2

In the switching power supply device 100 according to Embodiment 1, the peak value of the primary current remains constant regardless of the change in on-frequency (oscillatory frequency) of the switching element 5. A switching power supply device according to Embodiment 2, concurrently, changes the peak value of the primary current according to the change in on-frequency. When the on-frequency decreases in a state in which the peak value of the primary current is fixed at a first current value, for example, the switching power supply according to Embodiment 2 discontinuously decreases the peak value of the primary current to a second current value which differs from the first current value, and varies the on-frequency under the decreased peak value.

Figure 7:
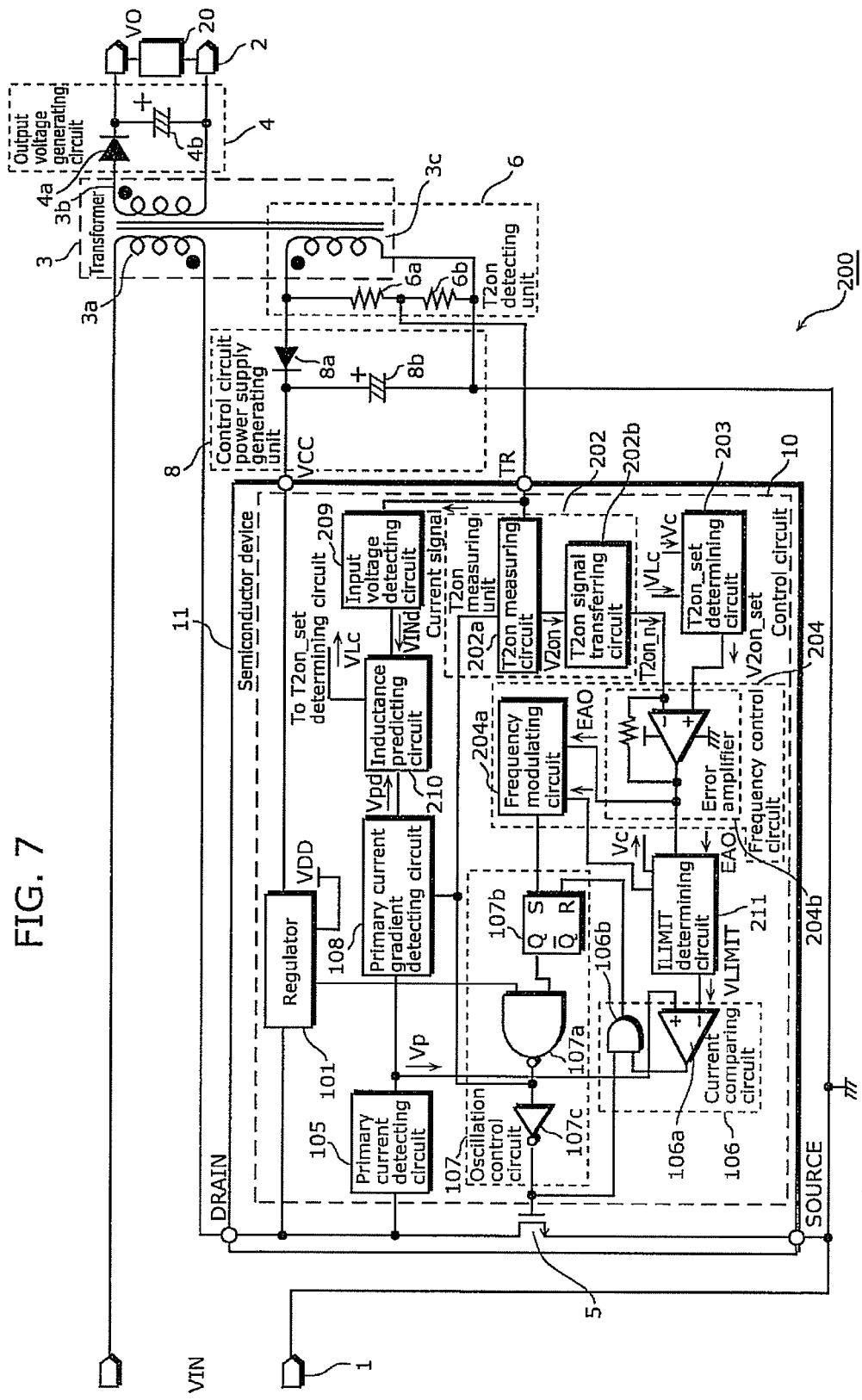
FIG. 7 is a block diagram exemplifying a circuit structure of a switching power supply device according to Embodiment 2.

FIG. 7 is a block diagram exemplifying a circuit structure of a switching power supply device 200 according to Embodiment 2. Comparison shows that the switching power supply device 200 in FIG. 7 differs from the switching power supply device 100 in FIG. 1 in that the switching power supply device 200 (i) does not have the input voltage detecting unit 7, and (ii) includes a T2on measuring unit 202, a T2on_set determining circuit 203, a frequency control circuit 204, an input voltage detecting circuit 209, an inductance predicting circuit 210, and an ILIMIT determining circuit 211 instead of the T2on measuring unit 102, the T2on_set determining circuit 103, the frequency control circuit 104, the input voltage detecting circuit 109, the inductance predicting circuit 110, and the ILIMIT determining circuit 111. Hereinafter, the points shared with those in Embodiment 1 shall be omitted, and the differences between Embodiments 1 and 2 are chiefly described.

The T2on measuring unit 202 includes a T2on measuring circuit 202a and a T2on signal transferring circuit 202b.

Similar to the T2on measuring circuit 102a, the T2on measuring circuit 202a measures the secondary-side conduction time period T2on according to the voltage level of a voltage signal provided from the T2on detecting unit 6, and provides the signal V2on having a voltage level corresponding to the measured T2on.

T2on signal transferring circuit 202b, placed between the T2on measuring circuit 202a and the frequency control circuit 204, is for example, a differentiating circuit including a capacitor and a resistor. The T2on signal transferring circuit 202b temporally averages the output signal V2on provided from the T2on measuring circuit 202a, and provides the averaged output signal to an error amplifier 204b included in the frequency control circuit 204.

Described in Embodiment 1 is change of the oscillatory frequency Freq on a pulse-by-pulse basis with respect to V2on; concurrently, Described in Embodiment 2 is control according to a temporally averaged value. This control contributes to stabilization of an actual operation.

Based on a signal VLc provided from the inductance predicting circuit 210, the T2on_set determining circuit 203 sets the reference value T2on_set of the secondary-side conduction time period T2on. Specifically, the T2on_set determining circuit 203 sets T2on_set (i) great when the primary inductance value Lp detected by the inductance predicting circuit 210 is greater than the reference value Lp_set exemplifying the second threshold value, and (ii) small when the primary inductance value Lp is smaller than the reference value Lp_set.

Furthermore, the T2on_set determining circuit 203 sets the reference value T2on according to a signal Vc provided from the ILIMIT determining circuit 211. The setting of the T2on_set will be described hereinafter with reference to the drawings. Similar to the T2on_set determining circuit 103, the T2on_set determining circuit 203 provides the V2on_set signal whose voltage level reflects the set reference value T2on_set.

The frequency control circuit 204 includes a frequency modulating circuit 204a and the error amplifier 204b, and determines a frequency for on-off switching of the switching element 5.

Similar to the frequency modulating circuit 104a, the frequency modulating circuit 204a provides the CLOCK signal so that the oscillatory frequency Freq of the switching element 5 becomes greater as the signal EAO becomes greater. In addition, the frequency modulating circuit 204a changes the oscillatory frequency Freq according to a signal provided from the ILIMIT determining circuit 211. Between the signal EAO and the oscillatory frequency Freq, specifically, a relationship shown in FIG. 8(A) is found.

Figure 8:
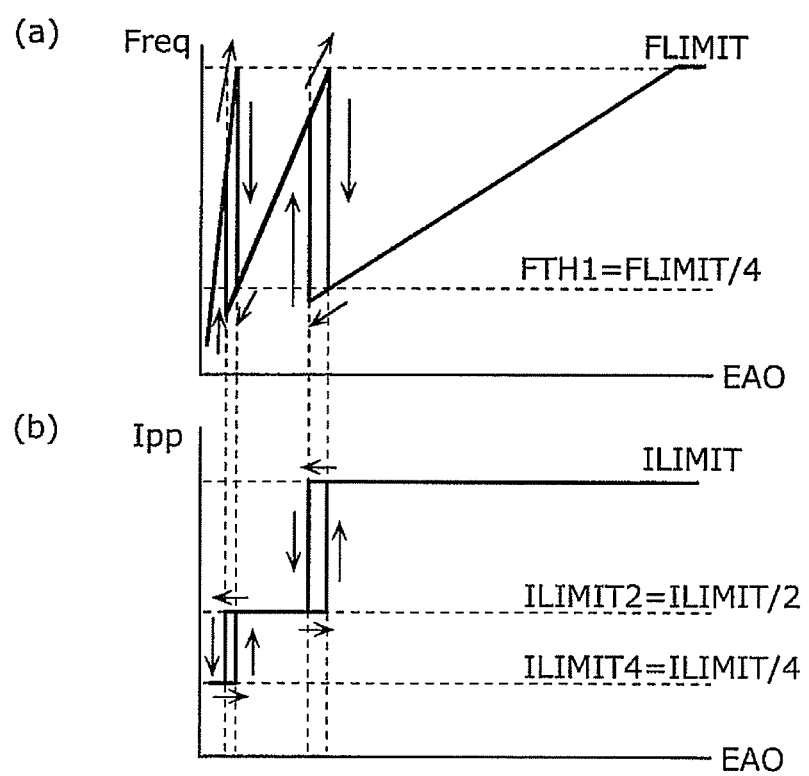
FIG. 8 exemplifies a relationship among the signal EAO, the oscillatory frequency Freq, and the peak value Ipp of the primary current according to Embodiment 2.

FIG. 8 exemplifies a relationship among the signal EAO, the oscillatory frequency Freq, and the peak value of the primary current Ipp according to Embodiment 2. The oscillatory frequency Freq, as shown in FIG. 8(A), has a maximum value FLIMIT set by the frequency modulating circuit 204a.

The frequency modulating circuit 204a, as shown in FIG. 8, changes the oscillatory frequency Freq according to magnitude of the signal EAO and of the peak value Ipp of the primary current.

The error amplifier 204b amplifies the difference between (i) V2on which is temporally averaged by the T2on signal transferring circuit 202b, and (ii) the output signal V2on_set of the T2on_set determining circuit 203. The output signal EAO, which is the amplified signal, is provided to the frequency modulating circuit 204a and to the ILIMIT determining circuit 211.

Connected to a TR terminal, the input voltage detecting circuit 209 detects the input voltage VIN. The switching power supply device 100 according to Embodiment 1 detects an input voltage by the an input voltage detecting unit 7; concurrently, the switching power supply device 200 according to Embodiment 2 uses the T2on detecting unit 6 to detect an input voltage. The input voltage detecting circuit 209 detects a current signal flowing from the TR terminal while the switching element 5 is on, and provides to the inductance predicting circuit 210 the signal VINd. The signal VINd is based on a current amount of the detected current signal.

As shown in FIG. 2, a voltage of the auxiliary winding 3c while the switching element 5 is on is represented as $-VIN \times Nb/Np$. Here, Nb represents the number of turns of the auxiliary winding 3c. According to the above expression, proportional to the input voltage VIN is the amount of a current flowing from the TR terminal via the resistor 6a while the switching element 5 is on. Hence, the output signal VINd provided from the input voltage detecting circuit 209 is based on the input voltage VIN.

Similar to the inductance predicting circuit 110, the inductance predicting circuit 210 predicts the primary inductance value Lp according to the output signal VINd provided from the input voltage detecting circuit 209. The inductance predicting circuit 110 according to Embodiment 1 provides a signal to the ILIMIT determining circuit 111; concurrently, the inductance predicting circuit 210 according to Embodiment 2 provides a signal to the T2on_set determining circuit 203. Specifically, the inductance predicting circuit 210 provides a signal used to increase T2on_set when determining that the detected primary inductance value Lp is greater than the reference value Lp_set. When determining that the detected primary inductance value Lp is smaller than the reference value Lp_set, on the contrary, the inductance predicting circuit 210 provides a signal used to make T2on_set small.

Thus, the inductance predicting circuit 210 can improve accuracy of the output voltage detection according to Equation 1 by (i) detecting the primary inductance value Lp out of the input voltage VIN and the gradient Ap of the primary current Ip, and (ii) changing a value of T2on_set according to the detected primary inductance value.

The ILIMIT determining circuit 211 sets ILIMIT representing a threshold value of the peak value Ipp of the primary current according to the output signal EAO provided from the error amplifier 204b. In other words, as seen in FIG. 8(b), the ILIMIT determining circuit 211 changes the peak value Ipp of the primary current according to the secondary-side conduction time period T2on; specifically, the output signal EAO. This differs from Embodiment 1 involving executing control to change the oscillatory frequency Freq with the peak value Ipp of the primary current remaining constant as shown in FIGS. 3B and 4B.

Described next is a change of the oscillatory frequency Freq and the peak value Ipp of the primary current in the case where the output current IO changes.

Figure 9:
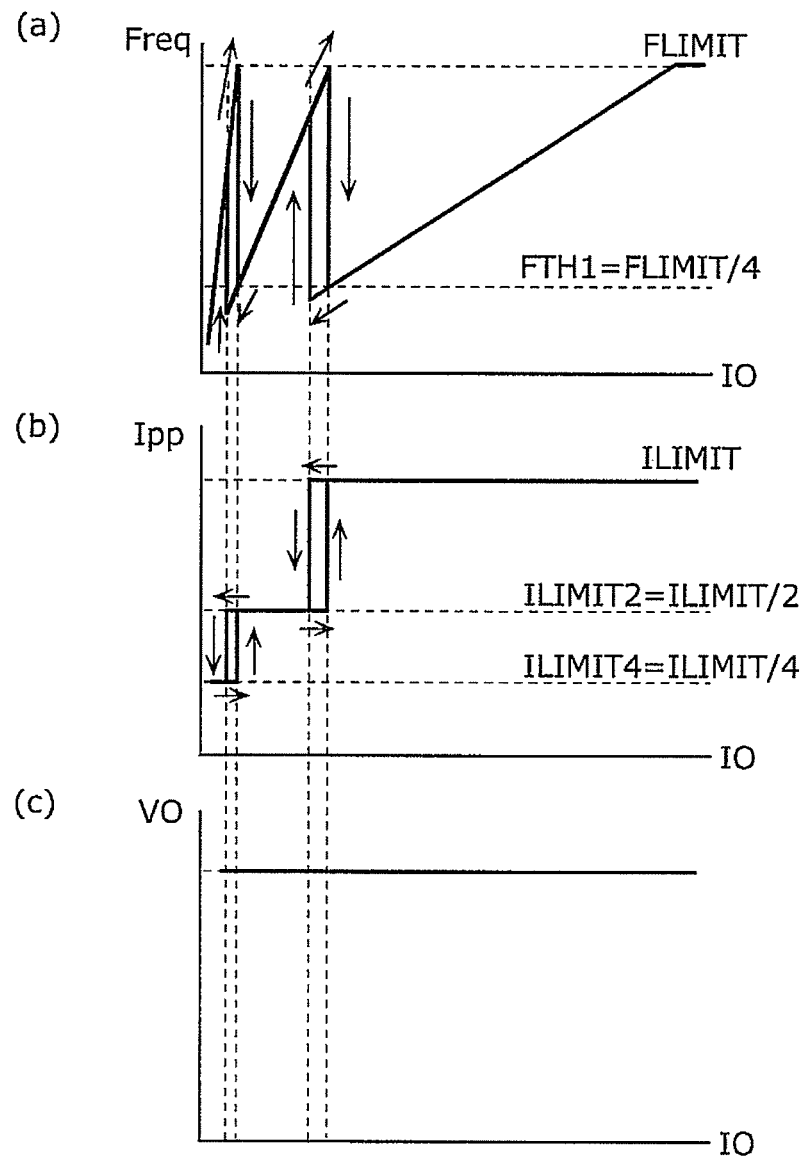
FIG. 9 exemplifies a relationship among the output current IO, the oscillatory frequency Freq, the peak value Ipp of the primary current, and the output voltage VO according to Embodiment 2.

FIG. 9 exemplifies a relationship among the output current IO, the oscillatory frequency Freq, the peak value of the primary current Ipp, and the output voltage IO according to Embodiment 2. As shown in FIG. 9(a), the oscillatory frequency Freq has a maximum value FLIMIT set by the frequency modulating circuit 204a. The peak value Ipp of the primary current has the maximum value ILIMIT set by the ILIMIT determining circuit 211.

It is noted that, as described in Embodiment 1, the change of the output voltage VO according to the change of the output current IO is detected with the secondary-side conduction time period T2on. The secondary-side conduction time period T2on is also used for controlling the signal EAO. The relationship among the signal EAO, the oscillatory frequency Freq, and the peak value Ipp of the primary current as shown in FIG. 8 makes possible stabilizing the output voltage VO even though the output current IO changes as below.

Assumed first is the case where the output current IO decreases in a state (State 1) having the peak value Ipp of the primary current set to ILIMIT, as shown in FIG. 9(B). Here, the peak value Ipp of the primary current exemplified as the first threshold value remains to be the constant value ILIMIT exemplified as the first current value. As shown in FIG. 9(A), the oscillatory frequency Freq decreases as the output current IO decreases.

Once the oscillatory frequency Freq decreases to a threshold value FTH1 (a quarter of FLIMIT) exemplified as a third threshold value, the ILIMIT determining circuit 211 provides a changed VLIMIT in order for the peak value Ipp of the primary current to be ILIMIT2 (a half of ILIMIT). ILIMIT 2 is an example of a second current value which is smaller than the first current value. Simultaneously, the oscillatory frequency Freq changes from a threshold value FTH1 (a quarter of FLIMIT) to FLIMIT (State 2).

The important point here is that the same amount of energy is supplied before and after the change of the peak value Ipp of the primary current and the oscillatory frequency Freq. In other words, immediately before and after the reduction of the peak value of the primary current, the ILIMIT determining circuit 211 and the frequency control circuit 204 respectively change the peak value Ipp of the primary current and the oscillatory frequency Freq so that the same amount of energy is supplied to the output unit 2.

For example, supplied energy in a discontinuous mode on a flyback power supply is represented as $Lp \times Freq \times Ipp^2/2$. In Embodiment 2, the oscillatory frequency Freq quadruples when the peak value Ipp of the primary current halves. Thus, the supplied energy is balanced.

Here, in addition, the ILIMIT determining circuit 211 provides a signal Vc indicating the change of ILIMIT to the T2on_set determining circuit 203. When receiving the signal Vc, the T2on_set determining circuit 203 halves the value of the T2on_set in order to hold the relationship represented in Equation 1.

As seen in FIG. 9, it is noted in Embodiment 2 that hysteresis is used in transitions from State 1 to State 2, and from State 2 to State 1. In other words, when the oscillatory frequency Freq increases to a fourth threshold value with the peak value Ipp of the primary current set to ILIMIT 2, the ILIMIT determining circuit 211 increases the first threshold value to ILIMIT. The peak value Ipp exemplifies the first threshold value, and the fourth threshold value differs from the threshold value FTH1 exemplifying the third threshold value. Here, the frequency control circuit 204 decreases the oscillatory frequency Freq when the first threshold value increases to ILIMIT. In other words, as shown in FIG. 9, the oscillatory frequencies Freq are not equal but different when observed at (i) a point where State 2 returns to State 1, and (ii) a point where State 1 changes to State 2. The hysteresis is effective in preventing frequent changes of power supply operations between States 1 and 2.

For the sake of convenience in description, it is noted in the above description that the transition from State 1 to State 2 tends to occur when the oscillatory frequency Freq=FLIMIT/4 holds. Considering the entire operation, however, the transition from State 2 to State 1 preferably occurs when the oscillatory frequency Freq=FLIMIT/4 holds. It is noted that the hysteresis causes a point of the transition from State 1 to State 2 to be shifted. As a matter of course, when the transition from State 1 to State 2 occurs in this case, the change of the oscillatory frequency quadruples and the change of Ipp halves. Hence, the supplied energy is set to be equal and kept from changing immediately before and after the transition of States.

Thus, the supplied energy does not change even in the case where the output current IO changes. Accordingly, as shown in FIG. 9(C), the output voltage VO remains to be a constant value.

It is noted in Embodiment 2 that, when the output current IO further decreases, followed by the decrease in the oscillatory frequency Freq, transition to State 3 occurs. State 3 involves the peak value Ipp of the primary current decreasing to ILIMIT/4, as occurring in the transition from State 1 to State 2. This transition is similar to that from State 1 to State 2. A detailed description thereof shall be omitted.

As described above, the switching power supply device 200 according to Embodiment 2 of the present invention can vary the oscillatory frequency Freq with the peak value Ipp of the primary current decreased when the oscillatory frequency Freq decreases. Since the switching power supply device 100 according to Embodiment 1 has the peak value Ipp of the primary current remain constant and set high, the switching power supply device 100 might develop a noise problem caused by mounted parts, such as a transformer, when the oscillatory frequency Freq decreases to an audible filed. The switching power supply device 200 according to Embodiment 200, however, can prevent such noise thanks to the above described feature.

It is noted that the switching power supply device 200 according to Embodiment 2 may be set to have slightly smaller supplied energy when the transition occurs from State 1 to State 2.

Figure 10:
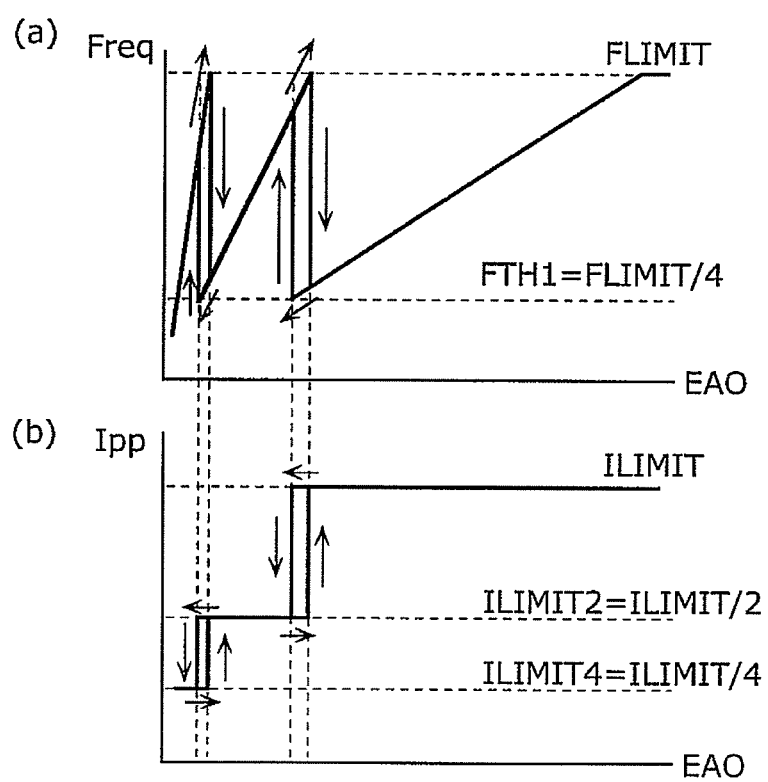
FIG. 10 exemplifies another relationship among the signal EAO, the oscillatory frequency Freq, and the peak value Ipp of the primary current according to Embodiment 2.

FIG. 10 exemplifies another relationship among the signal EAO, the oscillatory frequency Freq, and the peak value Ipp of the primary current according to Embodiment 2. FIG. 10 show that, in the transition occurring from State 1 to State 2 when Ipp halves, the value of the oscillatory frequency Freq changes to a value slightly lower than a quadrupled Freq, and the supplied energy becomes slightly smaller. In other words, the ILIMIT determining circuit 211 and the frequency control circuit 204 respectively change the peak value Ipp and the oscillatory frequency Freq so that energy which is supplied to the output unit 2 immediately before the peak value of the primary current decreases is greater than energy which is supplied to the output unit 2 immediately after the peak value of the primary current decreases.

Figure 11:
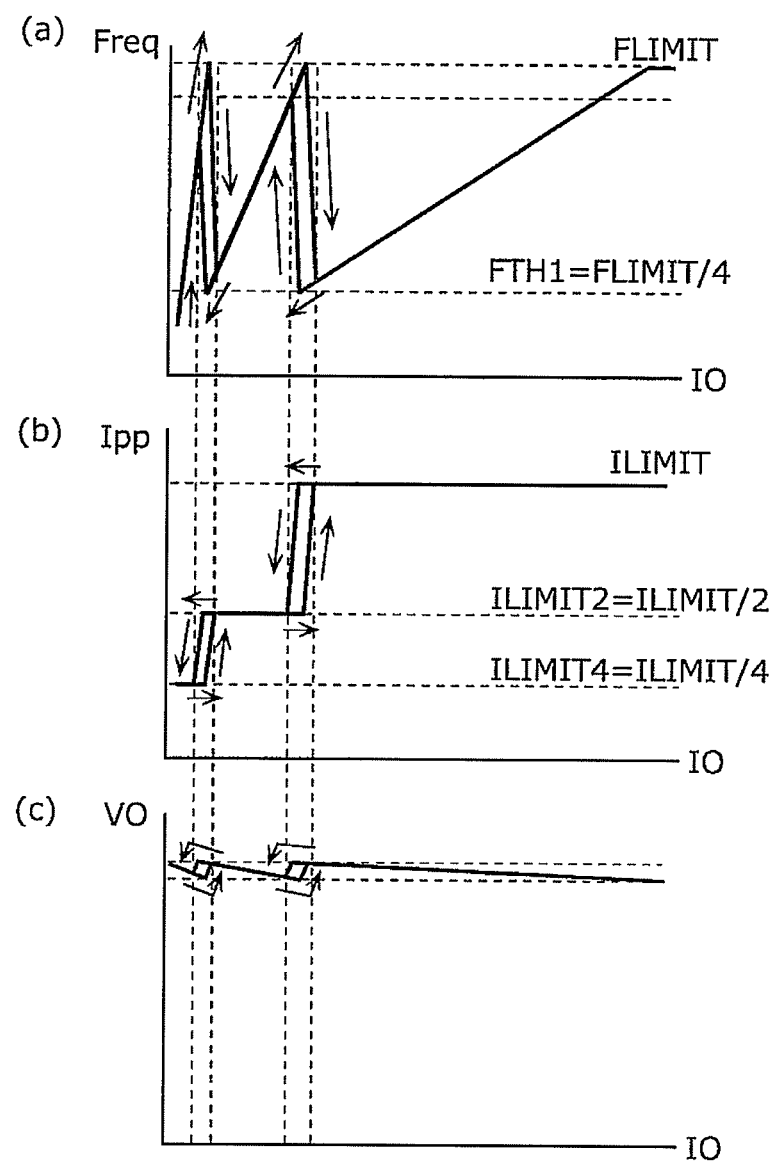
FIG. 11 exemplifies another relationship among the output current IO, the oscillatory frequency Freq, the peak value Ipp of the primary current, and the output voltage VO according to Embodiment 2.

FIG. 11 exemplifies another relationship among the output current IO, the oscillatory frequency Freq, the peak value of the primary current Ipp, and the output voltage VO according to Embodiment 2. As shown in FIG. 11, the oscillatory frequency Freq and the peak value Ipp of the primary current change depending on the change in the output current IO.

As shown in FIG. 10 that, in the transition occurring from State 1 to State 2, the oscillatory frequency Freq and the peak value Ipp of the primary current change so that the supplied energy becomes slightly smaller. Accordingly, the output voltage VO decreases. When the transition occurs from State 2 to State 1, on the contrary, the output voltage VO increases.

Described below is an effect resulting from the transition of the supplied energy in changing States.

Suppose the switching power supply device 200 according to Embodiment 2 is, for example, a power supply adapter with a cable connected to the output unit 2. The cable includes a resistance component. The resistance component develops a voltage difference between (i) a voltage (a voltage between the switching power supply device 200 and the cable) of the output unit 2 included in the switching power supply device 200 and (ii) a voltage at the tip of the cable. The voltage difference developed here is the product of a value of resistance of the cable and a value of an output current. Thus, the voltage at the tip of the cable decreases as the output current increases.

Figure 12:
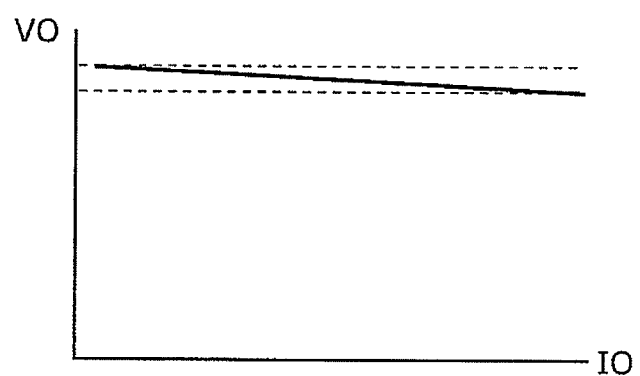
FIG. 12 exemplifies another relationship between the output current IO and output voltage VO according to Embodiment 1.

FIG. 12 exemplifies a relationship between (i) the output current IO and (ii) the output voltage VO in a power supply operation of the switching power supply device 100 according to Embodiment 2. FIG. 12 shows that the output voltage VO is expected to decrease as the output current IO increases.

The technique shown in Embodiment 2 corrects a change in the output voltage at the tip of the cable. As shown in FIG. 11, the transition from State 1 to State 2 changes the supplied energy. Thus, the output voltage decreases in the transition of States. When there is a change in the output voltage IO, the correction technique can decrease the change in the output voltage.

Embodiment 3

A switching power supply device according to Embodiment 3 measures the secondary-side conduction time period T2on by comparing a voltage occurring on an input terminal of a switching element and an input voltage applied to an input unit. This eliminates the need for an auxiliary winding in a transformer. Thus, the switching power supply device according to Embodiment 3 can stabilize an output voltage in a simple structure.

Figure 13:
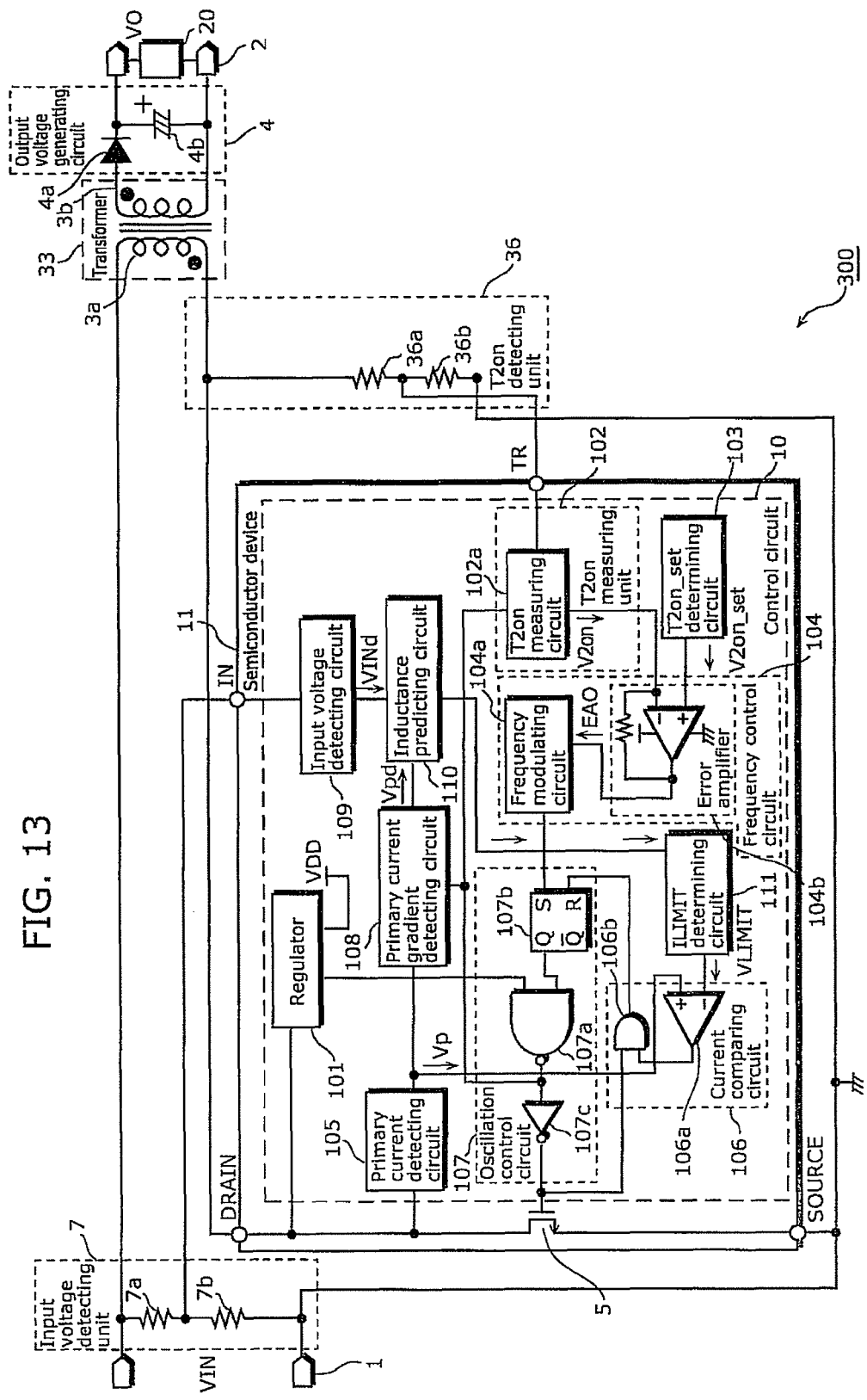
FIG. 13 is a block diagram exemplifying a circuit structure of a switching power supply device according to Embodiment 3.

FIG. 13 is a block diagram exemplifying a circuit structure of a switching power supply device 300 according to Embodiment 3. Comparison shows that a switching power supply device 300 shown in FIG. 13 differs from the switching power supply device 100 according to Embodiment 1 shown in FIG. 1 in (i) including a transformer 33 and a T2on detecting unit 36 instead of the transformer 3 and the T2on detecting unit 6, and (ii) omitting the control circuit power supply generating unit 8. Hereinafter, the points shared with those in Embodiment 1 shall be omitted, and the differences between Embodiments 1 and 3 are chiefly described.

The transformer 33 includes the primary winding 3a and the secondary winding 3b. The transformer 3 according to Embodiment 1 includes the auxiliary winding 3c; however, the transformer 33 does not include an auxiliary winding. The connections of the primary winding 3a and the secondary winding 3b are similar to those described in Embodiment 1.

The T2on detecting unit 36 includes resistors 36a and 36b, and provides to the TR terminal of the semiconductor device 11 a voltage change proportional to an alternate current occurring on the primary winding 3a. The T2on detecting unit 36 exemplifies a voltage-corresponding-to-secondary-current detecting unit. An end of the resistor 36a is connected to an end (DRAIN terminal) of the primary winding 3a. The other end of the resistor 36a is connected to an end of the resistor 36b. The other end of the resistor 36b is grounded. Furthermore, connection points of the resistors 36a and 36b are connected to the TR terminal.

In Embodiment 3, the T2on measuring circuit 102a measures, as the secondary-side conduction time period T2on, a time period from the switching element 5 turning off to a drain voltage VDS going equal to the input voltage VIN. Here, the drain voltage VDS represents a voltage value on the DRAIN terminal which is an input terminal of the switching element 5.

The other structural elements included in the switching power supply device 300 according to Embodiment 3 execute operations similar to those described in Embodiment 1.

It is noted that the regulator 101 operates so that a current is supplied to the internal circuit power supply VDD of the semiconductor device 11 only from the DRAIN terminal of the semiconductor device 11.

According to the above structure, the switching power supply device 300 according to Embodiment 3 can stabilize the output voltage VO in a simple structure without an auxiliary winding.

Embodiment 4

Described below is a switching power supply device according to Embodiment 4 with reference to FIG. 14. Detailed here are the differences between Embodiments 1 and 4.

Figure 14:
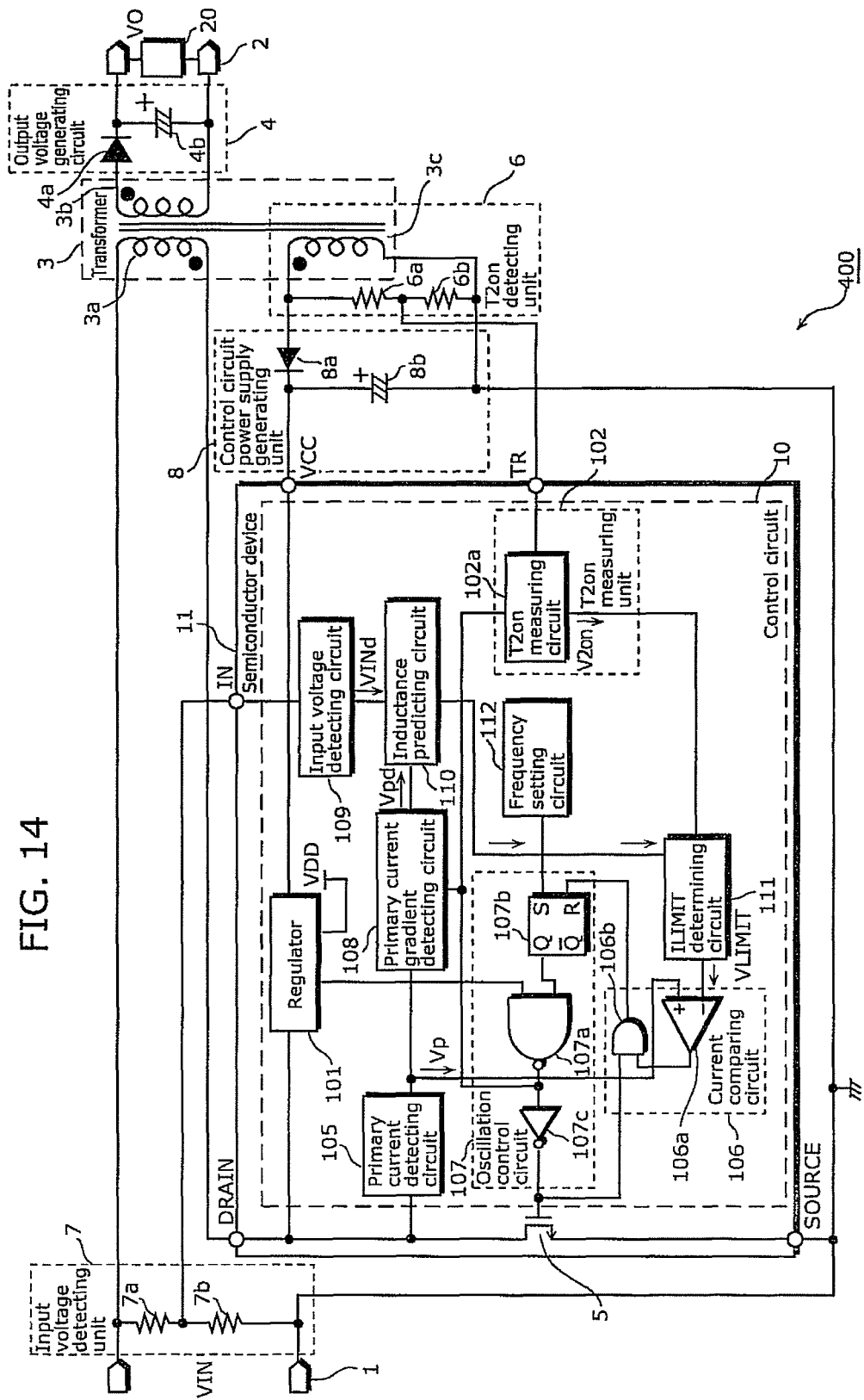
FIG. 14 is a block diagram exemplifying a circuit structure of a switching power supply device according to Embodiment 4.

FIG. 14 is a block diagram exemplifying a circuit structure of a switching power supply device 400 according to Embodiment 4.

Embodiment 4 differs from Embodiment 1 in that the output signal V2on of the T2on measuring circuit 102a is provided to the ILIMIT determining circuit 111. The ILIMIT determining circuit 111 is capable of change the output signal VLIMIT according to the signal V2on. A frequency setting circuit 112 provides the pulse signal CLOCK to the SET terminal of an RS flip-flop 107b at a constant period. This allows the switching element 5 to turn on at a constant frequency.

In Embodiment 4, the switching determining circuit is likely to include the frequency setting circuit 112, the ILIMIT determining circuit 111, the current comparing circuit 106, and the oscillation control circuit 107. Here, the switching determining circuit controls on-off switching of the switching element 5 in order to keep the proportionality between (i) the primary current flowing into the primary winding 3a and (ii) the secondary-side conduction time period representing a time period in which the secondary current flows. Depending on a magnitude of the inductance value predicted by the inductance predicting circuit 110, the switching determining circuit changes a proportionality coefficient in the proportionality between (i) the primary current flowing into the primary winding 3a and (ii) the secondary-side conduction time period representing the time period in which the secondary current flows.

Since the ILIMIT determining circuit 111 is capable of changing the signal VLIMIT according to the signal V2on, the switching power supply device has the peak value Ipp of the primary current change according to the secondary-side conduction time period T2on.

Here, in the control circuit 10, each operation of the T2on measuring circuit 102a, the ILIMIT determining circuit 111, and the current comparing circuit 106 is set so that the peak value Ipp of the primary current changes according to the secondary-side conduction time period T2on in order for the above described Equation 5 to hold.

Embodiment 4 achieves a feature in that the output voltage VO remains constant by the peak value Ipp of the primary current changing so as to satisfy the above Equation 5.

Similar to Embodiment 1, in addition, achieved in Embodiment 4 is correction of variations in output voltage due to an L value of a transformer. Embodiment 4 introduces a mechanism to execute the correction.

Similar to Embodiment 1, the input voltage detecting circuit 109 provides to the inductance predicting circuit 110 the output signal VINd which is based on the input voltage, and the primary current gradient detecting circuit 108 provides to the inductance predicting circuit 110 the signal Vdp which is based on the primary current value Ip in Tdet-time since the turn-on of the switching element 5.

In Embodiment 4, the peak value Ipp of the primary current changes in order to satisfy the above Equation 5. In design, concurrently, the peak value Ipp of the primary current is set to change in order to satisfy Ipp=B×T2on (B is a constant value). Here, the inductance predicting circuit 110 has a reference value Vdp_set of the signal Vdp changing according to VINd. When a value of the provided signal Vdp is greater than Vdp_set, the inductance predicting circuit 110 determines that the primary inductance value Lp is small, and provides to the ILIMIT determining circuit 111 a signal used for making the constant value B great. On the contrary, when a value of the provided signal Vdp is smaller than Vdp_set, the inductance predicting circuit 110 determines that the primary inductance value Lp is great, and provides to the ILIMIT determining circuit 111 a signal used for making the constant value B small.

Even when the inductance value Lp of the primary winding changes, this can detect to correct the change. Thus, variations in the output voltage VO can be reduced.

The semiconductor device 11 used in Embodiment 4 is capable of trimming the value B in an inspection process after the manufacturing thereof so that variations in the above constant value B are reduced. When the semiconductor device 11 is put on the market, a magnitude of variations in the value B is articulated as a specifications value to show performance of the semiconductor device.

Here, the value B is calculated by Ipp/T2on where Ipp is the peak value of the primary current and T2on is the secondary-side conduction time period. The reduction of the variations in the value B is equivalent to the reduction of the variations in ILIMIT/T2on_set calculated in Embodiment 1.

Embodiment 4, as described above, can achieve (i) correction of variations in inductance value of the primary winding, and (ii) performing trimming in order to reduce variations in Ipp/T2on where Ipp is the peak value of the primary current and T2on is the secondary-side conduction time period. Therefore, the switching power supply device 400 according to Embodiment 4 can reduce variations in the control circuit 10 of the switching element 5, and provide a high-accuracy and stable output voltage.

Although only some exemplary Embodiments of a switching power supply device according to an implementation of this invention have been described in detail above, those skilled in the art will readily appreciate that many modifications are possible in the exemplary Embodiments without materially departing from the novel teachings and advantages of this invention. Accordingly, all such modifications are intended to be included within the scope of this invention.

For example, the prediction of the primary inductance value Lp described in Embodiments 1 to 4 can be similarly achieved using a different technique as far as the primary inductance value Lp is predicted out of the input voltage VIN and the gradient Ap of the triangular waveform of the primary current Ip.

For example, the inductance predicting circuits 110 and 210 may (i) measure a primary current value at one point after the turn-on, and another primary current value in a certain time period since the one point, and (ii) predict the gradient Ap of the triangular waveform of the primary current Ip out of the difference between the primary current value and the other primary current value. The inductance predicting circuits 110 and 210 may also measure a time period in which a primary current value reaches a certain value, and predict the gradient Ap of the triangular waveform of the primary current Ip out of the measured time period.

The T2on signal transferring circuit 202b may be other than a differentiating circuit. In other words, any technique is allowable as far as V2on can be converted into a time-average value V2on_on.

For example, the T2on signal transferring circuit 202b may be a circuit to provide, as V2on_on, an average value of accurate V2on which is obtained in a certain period. The T2on signal transferring circuit 202b may also be a circuit which provides an average value of n V2on signals.

In Embodiments 1 and 2, the T2on measuring circuits 102a and 202a measure, as the secondary-side conduction time period T2on, the period from the switching element 5 turning off to the auxiliary winding voltage VB going zero. An essential issue here is the detection of a time point at which the voltage on the auxiliary winding 3c changes from (i) a voltage in proportion to the output voltage VO (ii) to zero voltage. Thus, the detected value may not necessarily be zero voltage: the detected value may vary between a voltage in proportion to the output voltage VO and zero voltage.

In Embodiment 3, measured as the secondary-side conduction time period T2on is the time period in which the drain voltage VDS goes equal to the input voltage VIN. An essential issue here is the detection of a time point at which the drain voltage VDS changes from (i) a voltage value obtained when a flyback voltage is applied to the input voltage VIN to (ii) the input voltage VIN. Thus, the detected value may not necessarily be the input voltage VIN: the detected value may vary between (i) a voltage value obtained when a flyback voltage is applied to the input voltage VIN and (ii) the input voltage VIN.

It is noted that the switching element 5 and the control circuit 10 can be provided on a single semiconductor substrate and easily unified. Hence, providing main circuit parts on a single semiconductor substrate makes possible reducing the number of parts used for the circuit. This can achieve reduction: in size and weight of a power supply device at ease; and in the cost of the power supply device. In addition, only the control circuit 10 may be formed on a semiconductor substrate, and the switching element may be formed as a separate semiconductor device.

INDUSTRIAL APPLICABILITY

A switching power supply device according to an implementation of the present invention is capable of (i) reducing variations of a control circuit included in a switching element, and (ii) providing a high-accuracy and stable output voltage. The switching power supply device can be used as a small power supply adapter and a battery charger.

What is claimed is:

1. A switching power supply device comprising:
an input unit which includes a first input terminal and a second input terminal, and configured to receive an input voltage;
a transformer which includes a primary winding and a secondary winding, said primary winding having one end connected to said first input terminal;
an output voltage generating circuit which is connected to said secondary winding, and generates an output voltage by rectifying and smoothing an alternate-current voltage appearing on said secondary winding;
an output unit configured to provide, to a load, the output voltage generated by said output voltage generating circuit;
a switching element which includes a first terminal, a second terminal, and a control terminal, said first terminal being connected to an other end of said primary winding, and said second terminal being connected to said second input terminal;
a control circuit which is connected to said control terminal, and controls on-off switching of said switching element; and
a voltage-corresponding-to-secondary-current detecting unit configured to provide a first signal having a voltage level corresponding to a secondary current flowing into said secondary winding,
wherein said control circuit includes:
a secondary-side conduction time period measuring circuit which measures a secondary-side conduction time period based on the voltage level of the first signal provided by said voltage-corresponding-to-secondary-current detecting unit, the secondary-side conduction time period representing a time period in which the secondary current flows;
a reference value determining circuit which determines a reference value of the secondary-side conduction time period;
a frequency control circuit which provides a second signal used for changing an on-frequency of said switching element in order to narrow a difference between (i) the secondary-side conduction time period measured by said secondary-side conduction time period measuring circuit and (ii) the reference value determined by said reference value determining circuit;
a primary current detecting circuit which detects a primary current flowing into said primary winding;
a current threshold value determining circuit which determines a first threshold value of the primary current;
a current comparing circuit which compares the primary current with the first threshold value to provide a third signal used for turning said switching element off when the primary current becomes equal to the first threshold value, the primary current being detected by said primary current detecting circuit, and the first threshold value being determined by said current threshold value determining circuit; and
an oscillation control circuit which controls on-off switching of said switching element according to the second signal and the third signal, and
wherein the switching power supply device has a constant voltage characteristic.

2. The switching power supply device according to claim 1, wherein said secondary-side conduction time period measuring circuit further provides a fourth signal having a voltage level corresponding to the measured secondary-side conduction time period, said reference value determining circuit further provides a fifth signal having a voltage level corresponding to the determined reference value, and said frequency control circuit includes:

an error amplifier which amplifies a difference between the fourth signal and the fifth signal, and provides a sixth signal indicating the amplified difference; and a frequency modulating circuit which provides the second signal so that the on-frequency becomes greater as the sixth signal provided by said error amplifier is greater.

3. The switching power supply device according to claim 1, wherein, when the on-frequency decreases to a third threshold value in a first state in which the first threshold value of the primary current is set to a first current value, said current threshold value determining circuit discontinuously decreases the first threshold value of the primary current to a second current value which is smaller than the first current value, and said frequency control circuit increases the on-frequency when the first threshold value of the primary current decreases to the second current value.

4. The switching power supply device according to claim 3, wherein, when the on-frequency increases to a fourth threshold value in a second state in which the first threshold value of the primary current is set to the second current value, said current threshold value determining circuit increases the first threshold value of the primary current to the first current value, the fourth threshold value being different from the third threshold value, and said frequency control circuit decreases the on-frequency when the first threshold value of the primary current increases to the first current value.

5. The switching power supply device according to claim 3, wherein said frequency control circuit and said current threshold value determining circuit respectively change the on-frequency and the primary current so that, in the first state, a same amount of energy is supplied to said output unit immediately before and after the first threshold value of the primary current decreases to the second current value.

6. The switching power supply device according to claim 3, wherein said frequency control circuit and said current threshold value determining circuit respectively change the on-frequency and the primary current, so that, in the first state, energy which is supplied to said output unit immediately before the first threshold value of the primary current decreases to the second current value is greater than energy which is supplied to said output unit immediately after the first threshold value of the primary current decreases to the second current value.

7. The switching power supply device according to claim 1, further comprising an input voltage detecting unit configured to detect the input voltage, wherein said voltage-corresponding-to-secondary-current detecting unit is connected to said first terminal of said switching element, and is configured to provide, as the first signal, a signal having a voltage level which is based on a voltage of said first terminal of said switching element, and said secondary-side conduction time period measuring circuit detects, as the secondary-side conduction time period, a time period in which the voltage detected by said voltage-corresponding-to-secondary-current detecting unit is higher than the voltage detected by said input voltage detecting unit, the secondary-side conduction time period being detected after said switching element turns off.

8. The switching power supply device according to claim 1, wherein said current threshold value determining circuit further includes a trimming circuit which trims the first threshold value of the primary current, and said reference value determining circuit further includes a trimming circuit which trims the reference value.

9. A semiconductor device which includes said control circuit according to claim 1, wherein at least a part of said control circuit is formed on a single semiconductor substrate.

10. The semiconductor device according to claim 9, further comprising said switching element which is formed on the single semiconductor substrate.

11. A switching power supply device comprising:

an input unit which includes a first input terminal and a second input terminal, and configured to receive an input voltage;

a transformer which includes a primary winding and a secondary winding, said primary winding having one end connected to said first input terminal;

an output voltage generating circuit which is connected to said secondary winding, and generates an output voltage by rectifying and smoothing an alternate-current voltage appearing on said secondary winding;

an output unit configured to provide, to a load, the output voltage generated by said output voltage generating circuit;

a switching element which includes a first terminal, a second terminal, and a control terminal, said first terminal being connected to an other end of said primary winding, and said second terminal being connected to said second input terminal;

a control circuit which is connected to said control terminal and controls on-off switching of said switching element;

a voltage-corresponding-to-secondary-current detecting unit configured to provide a first signal having a voltage level corresponding to a secondary current flowing into said secondary winding; and an input voltage detecting unit configured to detect the input voltage, wherein said control circuit includes:

a secondary-side conduction time period measuring circuit which measures a secondary-side conduction time period based on the voltage level of the first signal provided by said voltage-corresponding-to-secondary-current detecting unit, the secondary-side conduction time period representing a time period in which the secondary current flows;

a primary current detecting circuit which detects a primary current flowing into said primary winding;

a switching determining circuit which controls on-off switching of said switching element in order to keep proportionality between (i) the primary current flowing into said primary winding and (ii) the secondary-side conduction time period representing a time period in which the secondary current flows;

a gradient detecting circuit which detects a change of the primary current per unit time detected by said primary current detecting circuit; and an inductance predicting circuit which predicts an inductance value of said primary winding by employing (i) the input voltage detected by said input voltage detecting unit, and (ii) a change of the primary current per unit time detected by said primary current detecting circuit, wherein, depending on a magnitude of the inductance value predicted by said inductance predicting circuit, said switching determining circuit changes a proportionality coefficient in the proportionality between (i)

the primary current flowing into the primary winding and (ii) the secondary-side conduction time period representing the time period in which the secondary current flows.

12. The switching power supply device according to claim 11, wherein said switching determining circuit includes:
a reference value determining circuit which determines a reference value of the secondary-side conduction time period;
a frequency control circuit which provides a second signal used for changing an on-frequency of said switching element in order to narrow a difference between (i) the secondary-side conduction time period measured by said secondary-side conduction time period measuring circuit and (ii) the reference value determined by said reference value determining circuit;
a current threshold value determining circuit which determines a first threshold value of the primary current;
a current comparing circuit which compares the primary current with the first threshold value to provide a third signal used for turning said switching element off when the primary current becomes equal to the first threshold value, the primary current being detected by said primary current detecting circuit, and the first threshold value being determined by said current threshold value determining circuit; and
an oscillation control circuit which controls on-off switching of said switching element according to the second signal and the third signal.

13. The switching power supply device according to claim 12, wherein said reference value determining circuit determines the reference value, so that the inductance value which is predicted by said inductance predicting circuit (i) increases when the inductance value is greater than a second threshold value, and (ii) decreases when the inductance value is smaller than the second threshold value.

14. The switching power supply device according to claim 12, wherein said current threshold value determining circuit determines the first threshold value, so that the inductance value which is predicted by said inductance predicting circuit (i) increases when the inductance value is greater than a second threshold value, and (ii) decreases when the inductance value is smaller than the second threshold value.

15. The switching power supply device according to claim 11, wherein said switching determining circuit includes:
a frequency setting circuit which provides a second signal used for turning said switching element on at a constant cycle;
a current threshold value determining circuit which determines a first threshold value of the primary current according to the secondary-side conduction time period;
a current comparing circuit which compares the primary current with the first threshold value to provide a third signal used for turning said switching element off when the primary current becomes equal to the first threshold value, the primary current being detected by said primary current detecting circuit, and the first threshold being determined by said current threshold value determining circuit; and
an oscillation control circuit which controls on-off switching of said switching element according to the second signal and the third signal.

16. A method of trimming performed by a switching power supply device, said switching power supply device including an input unit which includes a first input terminal and a second input terminal, and configured to receive an input voltage; a transformer which includes a primary winding and a secondary winding, said primary winding having one end connected to said first input terminal; an output voltage generating circuit which is connected to said secondary winding, and generates an output voltage by rectifying and smoothing an alternate-current voltage appearing on said secondary winding; an output unit configured to provide, to a load, the output voltage generated by said output voltage generating circuit; a switching element which includes a first terminal, a second terminal, and a control terminal, said first terminal being connected to an other end of said primary winding, and said second terminal being connected to said second input terminal; a control circuit which is connected to said control terminal, and controls on-off switching of said switching element; and a voltage-corresponding-to-secondary-current detecting unit configured to provide a first signal having a voltage level corresponding to a secondary current flowing into said secondary winding,
wherein said control circuit includes a secondary-side conduction time period measuring circuit which measures a secondary-side conduction time period based on the voltage level of the first signal provided by said voltage-corresponding-to-secondary-current detecting unit, the secondary-side conduction time period representing a time period in which the secondary current flows; a reference value determining circuit which determines a reference value of the secondary-side conduction time period; a frequency control circuit which provides a second signal used for changing an on-frequency of said switching element in order to narrow a difference between (i) the secondary-side conduction time period measured by said secondary-side conduction time period measuring circuit and (ii) the reference value determined by said reference value determining circuit; a primary current detecting circuit which detects a primary current flowing into said primary winding; a current threshold value determining circuit which determines a first threshold value of the primary current; a current comparing circuit which compares the primary current with the first threshold value to provide a third signal used for turning said switching element off when the primary current becomes equal to the first threshold value, the primary current being detected by said primary current detecting circuit, and the first threshold value being determined by said current threshold value determining circuit; and an oscillation control circuit which controls on-off switching of said switching element according to the second signal and the third signal, and the switching power supply device has a constant voltage characteristic, and
wherein said current threshold value determining circuit further includes a trimming circuit which trims the first threshold value of the primary current, and said reference value determining circuit further includes a trimming circuit which trims the reference value,
said method comprising trimming, so that a variation range of a ratio of (i) the first threshold value of the primary current to (ii) the reference value of the secondary-side conduction time period is reduced.

17. A method of presenting a specification for a switching power supply device, said switching power supply device including an input unit which includes a first input terminal and a second input terminal, and configured to receive an input voltage; a transformer which includes a primary winding and a secondary winding, said primary winding having one end connected to said first input terminal; an output voltage generating circuit which is connected to said secondary winding, and generates an output voltage by rectifying and smoothing an alternate-current voltage appearing on said secondary winding; an output unit configured to provide, to a load, the output voltage generated by said output voltage generating circuit; a switching element which includes a first terminal, a second terminal, and a control terminal, said first terminal being connected to an other end of said primary winding, and said second terminal being connected to said second input terminal; a control circuit which is connected to said control terminal, and controls on-off switching of said switching element; and a voltage-corresponding-to-secondary-current detecting unit configured to provide a first signal having a voltage level corresponding to a secondary current flowing into said secondary winding, wherein said control circuit includes a secondary-side conduction time period measuring circuit which measures a secondary-side conduction time period based on the voltage level of the first signal provided by said voltage-corresponding-to-secondary-current detecting unit, the secondary-side conduction time period representing a time period in which the secondary current flows; a reference value determining circuit which determines a reference value of the secondary-side conduction time period; a frequency control circuit which provides a second signal used for changing an on-frequency of said switching element in order to narrow a difference between (i) the secondary-side conduction time period measured by said secondary-side conduction time period measuring circuit and (ii) the reference value determined by said reference value determining circuit; a primary current detecting circuit which detects a primary current flowing into said primary winding; a current threshold value determining circuit which determines a first threshold value of the primary current; a current comparing circuit which compares the primary current with the first threshold value to provide a third signal used for turning said switching element off when the primary current becomes equal to the first threshold value, the primary current being detected by said primary current detecting circuit, and the first threshold value being determined by said current threshold value determining circuit; and an oscillation control circuit which controls on-off switching of said switching element according to the second signal and the third signal, and the switching power supply device has a constant voltage characteristic, and wherein said current threshold value determining circuit further includes a trimming circuit which trims the first threshold value of the primary current, and said reference value determining circuit further includes a trimming circuit which trims the reference value, said method comprising presenting a variation range of a ratio of (i) the first threshold value of the primary current to (ii) the reference value of the secondary-side conduction time period to a user as a specification of the semiconductor device.

* * * * *